United States Patent
Goldstein et al.

(10) Patent No.: US 12,447,231 B2
(45) Date of Patent: Oct. 21, 2025

(54) HUMAN PLACENTAL TISSUE GRAFT PRODUCTS, METHODS, AND APPARATUSES

(71) Applicant: CryoLife, Inc., Kennesaw, GA (US)

(72) Inventors: Steven Goldstein, Atlanta, GA (US); Adam Martinez, Marietta, GA (US); Candace Law, Smyrna, GA (US)

(73) Assignee: CryoLife, Inc., Kennesaw, GA (US)

(*) Notice: Subject to any disclaimer, the term of this patent is extended or adjusted under 35 U.S.C. 154(b) by 0 days.

(21) Appl. No.: 17/863,675

(22) Filed: Jul. 13, 2022

(65) Prior Publication Data

US 2023/0091742 A1   Mar. 23, 2023

Related U.S. Application Data

(63) Continuation of application No. 16/068,210, filed as application No. PCT/US2017/012384 on Jan. 5, 2017, now abandoned.

(60) Provisional application No. 62/327,857, filed on Apr. 26, 2016, provisional application No. 62/276,655, filed on Jan. 8, 2016.

(51) Int. Cl.
| | |
|---|---|
| A61L 27/36 | (2006.01) |
| A61L 27/16 | (2006.01) |
| A61L 27/24 | (2006.01) |
| A61L 27/54 | (2006.01) |
| A61L 27/60 | (2006.01) |
| A61P 9/10 | (2006.01) |
| A61P 17/02 | (2006.01) |
| C12M 3/00 | (2006.01) |
| F26B 5/04 | (2006.01) |

(52) U.S. Cl.
CPC .......... *A61L 27/3604* (2013.01); *A61L 27/16* (2013.01); *A61L 27/24* (2013.01); *A61L 27/3695* (2013.01); *A61L 27/54* (2013.01); *A61L 27/60* (2013.01); *A61P 9/10* (2018.01); *A61P 17/02* (2018.01); *C12M 21/08* (2013.01); *F26B 5/04* (2013.01); *A61L 2300/236* (2013.01); *A61L 2300/254* (2013.01); *A61L 2300/414* (2013.01); *A61L 2300/434* (2013.01); *A61L 2430/40* (2013.01)

(58) Field of Classification Search
CPC .......... A61L 27/3604; A61L 2300/414; A61L 2300/236; A61L 27/54; A61L 27/3691; A61L 27/3695
See application file for complete search history.

(56) References Cited

U.S. PATENT DOCUMENTS

| | | |
|---|---|---|
| 4,619,257 A | 10/1986 | Linner et al. |
| 5,040,312 A | 8/1991 | Holzel |
| 5,711,969 A | 1/1998 | Patel et al. |
| 2004/0101958 A1 | 5/2004 | Shimp |
| 2010/0221830 A1 | 9/2010 | Sadler |
| 2011/0206776 A1 | 8/2011 | Tom et al. |
| 2012/0083900 A1 | 4/2012 | Samaniego et al. |
| 2013/0084314 A1 | 4/2013 | Horton et al. |
| 2013/0204393 A1 | 8/2013 | Samaniego |
| 2013/0230561 A1 | 9/2013 | Daniel et al. |
| 2014/0140964 A1* | 5/2014 | Brown ............... A61L 27/3691 424/572 |
| 2014/0348940 A1 | 11/2014 | Murphy et al. |
| 2015/0017663 A1* | 1/2015 | Hariri ................ G01N 33/5011 435/8 |
| 2015/0024159 A1 | 1/2015 | Bess et al. |
| 2017/0136153 A1* | 5/2017 | Ichim ................. C12N 5/0646 |
| 2018/0361026 A1 | 12/2018 | Qin et al. |

FOREIGN PATENT DOCUMENTS

WO    2017120371 A1    7/2017

OTHER PUBLICATIONS

Examination report issued in Australian Application No. 2021245207, mailed Jan. 9, 2023.
Office Action issued in Canadian Application No. 3010904, mailed Jan. 25, 2023.
Examination report No. 1 issued in AU 2017206020, mailed Jun. 19, 2020.
Examination report No. 2 issued for Australian Application No. 2017206020, dated Apr. 9, 2021.
Examination report No. 3 issued for Australian Application No. 2017206020, dated Jun. 7, 2021.
Communication pursuant to Article 94(3) EPC issued in EP 17736361.1, mailed May 29, 2020.
Notice of acceptance issued for Australian Application No. 2017206020, dated Jun. 23, 2021.
Halverson, Amy L. and Borgstrom, David C., 'Advanced Surgical Techniques for Rural Surgeons', 2014, ISBN 1-4939-1495-2, pp. 102-103.
Communication pursuant to Article 94(3) EPC issued in EP 17736361.1, mailed Nov. 10, 2021.
Alsbjörn, Bjarne F. "Biologic wound coverings in burn treatment." World journal of surgery 16.1 (1992): 43-46.
Pundir, Aena Jain, et al. "Comparative evaluation of the efficacy of human chorion and amnion with coronally advanced flap for recession coverage: A case series." Clinical advances in periodontics 6.3 (2016): 118-126.
PCT/US2017/012384 International Search Report and Written Opinion dated May 11, 2017.
Capone, Set al. Modulation of the immune response induced by gene electrotransfer of a hepatitis C virus DNA vaccine in nonhuman primates. Journal of Immunology. 177(10): 7462-7471 (2006).
Cheng, CW et al. Decellularized tissue and cell-derived extracellular matrices as scaffolds for orthopaedic tissue engineering. Biotechnology Advances. 32(2): 462-484 / 1-48 (2014).
Didomenico, Let al. Use of AmnioBandTm Membrane, a human amniotic membrane allograft, in the management of chronic non-healing diabetic foot ulcers. Case Studies and Clinical Review. MTF Wound Care. Oct. 28, 2015; Downloaded from the internet < http://mtfwoundcare.org/www/wp-content/uploads/2015/08/AmnioBand-Membrane-Case-Studies-FINAL-10.28.15.pdf >.

(Continued)

*Primary Examiner* — Emily A Cordas
(74) *Attorney, Agent, or Firm* — Lucas & Mercanti, LLP

(57) ABSTRACT

Provided herein are tissue grafts, and in particular human placenta-derived tissue grafts and methods and articles for the manufacture and use thereof.

17 Claims, 18 Drawing Sheets

(56) References Cited

OTHER PUBLICATIONS

European Patent Application No. 17736361 Supplementary European Search Report completed date of Jun. 27, 2019. 5 pages.

Koob, TJ et al. Angiogenic properties of dehydrated human amnion/chorion allografts: therapeutic potential for soft tissue repair and regeneration. Vascular Cell. 6(10): 1-10 (2014).

Koob, TJ et al. Biological properties of dehydrated human amnion/chorion composite graft: implications for chronic wound healing. International Wound Journal. 10(5): 1-8 (493-500) (2013).

Koob, TJ et al. Cytokines in single layer amnion allografts compared to multilayer amnion/chorion allografts for wound healing. Journal of Biomedical Materials Research, Part B. Applied Biomaterials. 103(5): 1133-1140 (2014).

Koob et al., Properties of dehydrated human amnion/chorion composite grafts: implications for wound repair and soft tissue regeneration. J Biomed Mater Res B Appl. Biomater. 102(6): 1353-1362 (2014).

Lomas, RJ et al. Assessment of the biological properties of human split skin allografts disinfected with peracetic acid and preserved in glycerol. Burns. 29(6): 515-525 (2003).

Mrugula, A et al. Amniotic membrane is a potential regenerative option for chronic non-healing wounds: a report of five cases receiving dehydrated human amnion/chorion membrane allograft. International Wound Journal. 13(4): 485-492 (2015).

Oliveira, et al. Composition and significance of glycosaminoglycans in the uterus and placenta of mammals. Brazilian Archives of Biology and Technology. 58(4): 512-520 (2015).

PCT/US2017/012384 International Preliminary Report on Patentability dated Jul. 10, 2018.

Rasier, R et al. Amniotic membrane welded to contact lens by 1470-nm diode laser: a novel method for sutureless amniotic membrane Transplantation. International Journal of Ophthalmology. 7(6): 996-1000 (2014).

Uchide et al., Possible roles of proinflammatory and chemoattractive cytokines produced by human fetal membrane cells in the pathology of adverse pregnancy outcomes associated with influenza virus infection. Mediators of Inflammation. doi: 10.1155/2012/270670 (2012).

Zhao, H et al. Xenogeneic acellular conjunctiva matrix as a scaffold of tissue-engineered corneal epithelium. PLoS One. 9(11): 1-9 (2014).

\* cited by examiner

HUMAN PLACENTAL TISSUE GRAFT PRODUCTS, METHODS, AND APPARATUSES

CROSS-REFERENCE TO RELATED APPLICATIONS

This application is a continuation of U.S. application Ser. No. 16/068,210, filed Jul. 5, 2018, which is a U.S. National Phase Application filed under 35 U.S.C. § 371 of PCT/US2017/0142384, filed Jan. 5, 2017, which claims the benefit of U.S. Provisional Application No. 62/276,655, filed Jan. 8, 2016, and U.S. Provisional Application No. 62/327,857, filed Apr. 26, 2016. Each of the aforementioned applications is hereby incorporated herein by reference in its entirety.

BACKGROUND OF THE INVENTION

The present disclosure relates generally to tissue grafts, and relates more particularly to human placenta-derived tissue grafts and methods for the manufacture and use thereof.

Current advanced wound care technology includes bioengineered skin substitutes that are effective as coverings for healing chronic wounds, but are expensive to construct and may require multiple applications of the constructs to the wound over an extended healing period. Other advanced wound coverings include human allograft based products, including cadaveric skin and fetal membrane-derived tissue grafts. Commercial human fetal membrane (also interchangeably referred to herein as "birth tissue," "human placenta," "human placental," "human amniotic" or "placenta-derived" tissue) allograft products include grafts of processed placental tissue in single layer or laminate form. Such processing includes drying, cryopreserving, and/or micronizing the placental tissue. Such human allograft wound coverings result in a shorter time to wound closure, more durably healed wounds, and a higher wound healing percentage as compared to non-human tissue wound care products. However, current processing of placental tissue may diminish the retention of critical bioactives in the tissue, such that the effectiveness of the placental tissue at promoting cell in-migration, proliferation, and differentiation or in limiting chronic inflammation is reduced. Additionally, such human placental tissue can stimulate activity of allogeneic lymphocytes, indicating presence of alloantigenicity, which may result in inflammation and attenuated wound healing effect. Moreover, current processing techniques may also contribute to increased observed variability of physical and biochemical properties among tissue grafts processed from different donors.

SUMMARY OF THE INVENTION

Described herein are methods of producing human placental tissue grafts that improve retention of bioactives in the processed tissue and reduce the antigenicity of the tissue, in addition to human placental tissue grafts having improved healing and handling properties.

In one aspect, described herein are tissue grafts comprising: a processed human fetal amniotic membrane comprising an amnion layer and a chorion layer wherein processing the human fetal amniotic membrane comprises: removing maternal decidua cells and cells of a trophoblast layer from the membrane; decontaminating the membrane to reduce its bioburden; compressing the membrane; and dehydrating the membrane, wherein processing the membrane provides a dense matrix having a reduced amount of maternal decidua cells without a step of delaminating the amnion layer from the chorion layer. In some embodiments, removing the maternal decidua cells and the cells of a trophoblast layer is carried out by mechanical, chemical, osmotic, or enzymatic treatment. In some embodiments, removing the cells of a trophoblast layer is carried out concurrently to removal of the maternal decidua cells. In some embodiments, the membrane is decontaminated with ethanol, peracetic acid, one or more antibiotics, or combinations thereof. In some embodiments, compressing the membrane comprises compacting the membrane. In some embodiments, the compressing or compacting the membrane step and the dehydrating the membrane step are carried out simultaneously. In some embodiments, the compressing or compacting step is subsequent to dehydrating. In some embodiments, the compressing or compacting step is prior to dehydrating. In some embodiments, the compressing or compacting the membrane step and the dehydrating the membrane step produces visibly distinguishable surfaces of the membrane. In some embodiments, the first surface of the membrane is relatively shiny and the second surface of the membrane is relatively matte. In some embodiments, the membrane is dehydrated to equal to or less than 20% by weight moisture content. In some embodiments, the membrane is dehydrated to a moisture content amount that allows for at least six month stability at room temperature. In some embodiments, the process further comprises packaging the membrane under inert conditions. In some embodiments, the process further comprises terminally sterilizing the membrane. In some embodiments, the membrane is secured onto a backing.

In another aspect, described herein is a tissue graft comprising a processed human fetal amniotic membrane comprising an amnion layer and a chorion layer wherein processing the human fetal amniotic membrane comprises: removing maternal decidua cells from the membrane; compressing the membrane; and dehydrating the membrane, wherein processing the membrane provides a dense matrix having a reduced amount of maternal decidua cells without a step of delaminating or separating the amnion layer from the chorion layer. In some embodiments, processing the human fetal amniotic membrane comprises removing the trophoblast cell layer. In some embodiments, compressing the membrane comprises compacting the membrane.

In some embodiments, the membrane matrix is collagenous. In some embodiments, the membrane matrix comprises bioactives. In some embodiments, the membrane matrix comprises glycoasminoglycans. In some embodiments, the membrane matrix comprises hyaluronic acid.

In some embodiments, the membrane matrix is more resistant to degradation at a wound or graft site as compared to an uncompressed human amniotic membrane. In some embodiments, the membrane matrix releases bioactives in a slow, controlled or extended manner as compared to an uncompressed human amniotic membrane. In some embodiments, the membrane matrix is resistant to degradative enzymes as compared to an uncompressed human amniotic membrane. In some embodiments, the release of bioactives is extended over at least three days. In some embodiments, the release of bioactives is extended over at least five days. In some embodiments, the release of bioactives is extended over at least seven days. In some embodiments, the release of bioactives is extended over at least ten days. In some embodiments, the release of bioactives is extended over at least fourteen days. In some embodiments, the release of bioactives is extended over at least 30 days. In some embodiments, the membrane matrix acts as a barrier to pathogens. In some embodiments, the membrane matrix allows for slow, controlled, or extended release of active growth factors and protease inhibitors at a wound or graft site.

In some embodiments, the membrane is not patterned or labeled to enhance durability and handling.

In some embodiments, the membrane comprises active growth factors, protease inhibitors or both. In some embodiments, the membrane comprises cytokines, extracellular matrix proteins, or combinations thereof. In some embodiments, the membrane comprises basic fibroblast growth factor (bFGF), hepatocyte growth factor (HGF), tissue inhibitor of metallopeptidase inhibitor-I (TIMP-1), or combinations thereof.

In some embodiments, removing maternal decidua cells is carried out by mechanical, chemical, osmotic, and/or enzymatic treatment. In some embodiments, the membrane is processed without enzymatic treatment. In some embodiments, the maternal decidua cells are treated with a hypotonic solution prior to removal. In some embodiments, removing the maternal decidua cells reduces the alloantigenicity of the membrane. In certain instances, wherein the alloantigenicity is less than 1 peripheral blood mononuclear cell (PBMC) Stimulation Index in a PBMC BrdU proliferation assay. In some embodiments, the membrane is not antigenic.

In some embodiments, the process further comprises removing cells from a trophoblast layer from the membrane. In certain instances, removing the cells from trophoblast layer is carried out by mechanical, chemical, osmotic, and/or enzymatic treatment. In certain instances, processing comprises an enzymatic treatment. In some embodiments, the enzyme is selected from the group consisting of trypsin, thermolysin, collagenase, metalloproteinase, dispase, hyaluronidase, papain, elastase, and pronase. In some embodiments, the enzyme is collagenase. In some embodiments, the enzyme is hyaluronidase. In some embodiments, the enzyme is elastase. In certain instances, the membrane is processed without enzymatic treatment. In certain instances, removing the cells from trophoblast layer is carried out concurrently to removal of the maternal decidua cells. In certain instances, the trophoblast layer is treated with a hypotonic solution prior to its removal.

In some embodiments, removal of the maternal decidua cells reduces the alloantigenicity of the membrane. In some embodiments, the alloantigenicity is less than 1 peripheral blood mononuclear cell (PBMC) Stimulation Index in a PBMC BrdU proliferation assay. In some embodiments, the membrane is not antigenic.

In some embodiments, the process further comprises folding the membrane. In some embodiments, the folded membrane has the amnion layer on the outside of the folded membrane. In some embodiments, the folded membrane has the chorion layer on the outside of the folded membrane. In some embodiments, the membrane is folded once. In some embodiments, the membrane is folded two to seven times. In some embodiments, the membrane is folded along a diagonal.

In some embodiments, the process further comprises stacking at least two membranes. In some embodiments, stacking at least two membranes results in a tissue graft having a chorion layer on the outside. In some embodiments, stacking at least two membranes results in a tissue graft having an amnion layer on the outside.

In some embodiments, the process further comprises rolling the membrane into a multilayered cylinder. In some embodiments, the membrane is folded over or rolled along a diagonal.

In some embodiments, the process further comprises decontaminating the membrane to reduce its bioburden. In certain instances, the membrane is decontaminated with ethanol, peracetic acid, one or more antibiotics, or combinations thereof. In certain instances the membrane is decontaminated with ethanol. In certain instances, the membrane is decontaminated with 60%-80% v/v ethanol. In certain instances, the membrane is decontaminated with 60%, 61%, 62%, 63%, 64%, 65%, 66%, 67%, 68%, 69%, 70%, 71%, 72%, 73%, 74%, 75%, 76%, 77%, 78%, 79%, or 80% v/v ethanol. In certain instances, the membrane is decontaminated with 60% v/v ethanol. In certain instances, the membrane is decontaminated with 65% v/v ethanol. In certain instances, the membrane is decontaminated with 70% v/v ethanol. In certain instances, the membrane is decontaminated with 75% v/v ethanol. In certain instances, the membrane is decontaminated with 80% v/v ethanol. In other instances, the membrane is decontaminated with peracetic acid. In other instances, the peracetic acid is at a concentration of about 0.01% to about 1% v/v. In other instances, the peracetic acid is buffered. In other instances, the buffer is at a pH of about 4.5 to about 7.5. In other instances, the buffer is a phosphate, HEPES, MOPS, TES, citrate, acetate, bicarbonate, PIPES, BES or Tris buffer. In other instances, the membrane is decontaminated with one or more antibiotics. In some instances, the bioburden is undetectable. In some instances, the bioburden is zero. In some instances, the bioburden is measured by an assay detecting microbial presence. In some instances, the decontamination preserves the bioactives of the membrane.

In some embodiments, the process is done under aseptic conditions. In some embodiments, the process done under aseptic conditions does not comprise a sterilization step.

In some embodiments, the compressing or compacting the membrane step and the dehydrating the membrane step are carried out simultaneously. In some embodiments, the compressing or compacting step is subsequent to dehydrating. In some embodiments, the compressing or compacting step is prior to dehydrating. In some embodiments, the compressing or compacting the membrane step and the dehydrating the membrane step produces visibly distinguishable surfaces of the membrane. In some instances, the first surface of the membrane is relatively shiny and the second surface of the membrane is relatively matte. In some embodiments, the compressing or compacting the membrane step and the dehydrating the membrane step preserves the bioactives of the membrane.

In some embodiments, the membrane is dehydrated to equal to or less than 20% by weight moisture content. In some embodiments, the membrane is dehydrated to equal to or less than 10% by weight moisture content. In some embodiments, the membrane is dehydrated to equal to or less than 5% by weight moisture content. In some embodiments, the membrane is dehydrated to a moisture content amount that allows for at least six month stability at room temperature. In some embodiments, the membrane is dehydrated to a moisture content amount that allows for at least twelve month stability at room temperature. In some embodiments, the membrane is dehydrated to a moisture content amount that allows for at least 24 month stability at room temperature. In some embodiments, the membrane is dehydrated to a moisture content amount that allows for at least five year stability at room temperature.

In some embodiments, the process further comprises terminally sterilizing the membrane. In some instances, the sterilizing is by ionizing radiation, ethylene oxide, supercritical carbon dioxide, peracetic acid, or combinations thereof.

In some embodiments, the membrane comprises at least 5,000 pg/mg of bFGF. In some embodiments, the membrane comprises at least 10,000 pg/mg of bFGF. In some embodiments, the membrane comprises at least 100 pg/mg of HGF. In some embodiments, the membrane comprises at least 300 pg/mg of HGF. In some embodiments, the membrane comprises at least 5,000 pg/mg of TIMP-1. In some embodiments, the membrane comprises at least 10,000 pg/mg of TIMP-1. In some embodiments, the membrane comprises at least 7,000 ng/mg of HA. In some embodiments, the membrane comprises at least 15,000 ng/mg of HA. In some embodiments, the membrane comprises at least 5,000 pg/mg of bFGF, at least 100 pg/mg of HGF, at least 5,000 pg/mg of TIMP-1, and at least 7,000 ng/mg of HA.

In some embodiments, the membrane is secured onto a backing. In some instances, the membrane is adhered to a backing during the dehydrating step. In some instances, the backing comprises a material selected from high density polyethylene (HDPE), low density polyethlyene (LDPE), ethylene/vinyl alcohol copolymer (EVOH), polypropylene (PP), polyethylene terephthalate (PET). amorphous polyethylene terephthalate (APET), glycol modified polyethylene terephthalate (PET-G), polyethylene naphthalate (PEN), ethylene acrylic acid copolymer (EAA), and polyamide (PA), polyvinyl chloride (PVC), polyvinylidene chloride (PVDC), polychlorotrifluoroethylene (PCTFE), vinylidene chloride/methyl acrylate copolymer, polyamide, polyester, polyurethane, silicone, a metalized film, an oxide coated film, nitrocellulose, nylon, and combinations thereof.

In some instances, the backing comprises at least one tab configured to secure the tissue graft. In certain instances, the tab is defined by a cut in the backing.

In some instances, the backing comprises at least two tabs configured to secure the tissue graft. In some instances, the backing comprises multiple tabs configured to secure different sizes of the tissue graft.

In another aspect, also described herein is a tissue graft comprising a processed human fetal amniotic membrane comprising an amnion layer and a chorion layer wherein processing the human fetal amniotic membrane comprises: removing maternal decidua cells from the membrane; decontaminating the membrane with buffered peracetic acid; compressing the membrane; and dehydrating the membrane, wherein processing the membrane provides a dense matrix having a reduced amount of maternal decidua cells without a step of delaminating or separating the amnion layer and chorion layer.

In some embodiments, the peracetic acid is at a concentration of about 0.01% to about 1% v/v. In some instances, the peracetic acid is buffered with a phosphate, HEPES, MOPS, TES, citrate, acetate, bicarbonate, PIPES, BES, or Tris buffer. In certain instances, the peracetic acid is buffered at a range of about 4.5 to about 7.5.

In another aspect, also described herein is a tissue graft comprising: a processed human fetal amniotic membrane comprising an amnion layer and a chorion layer wherein processing the human fetal amniotic membrane comprises: removing maternal decidua cells from the membrane; decontaminating the membrane with one or more antibiotics; compressing the membrane; and dehydrating the membrane, wherein processing the membrane provides a dense matrix having a reduced amount of maternal decidua cells without a step of delaminating the amnion layer and chorion layer.

In another aspect, also described herein is a tissue graft comprising a processed human membrane wherein processing the human membrane comprises: compressing the membrane; and dehydrating the membrane, wherein processing the membrane provides a dense matrix. In some embodiments, the human membrane is skin, dermis, small intestine, small intestine submucosa, urinary bladder, pericardium, peritoneum, placenta amnion, chorion, umbilical cord, or fascia.

In another aspect, also described herein is a tissue graft comprising a processed human membrane wherein processing the human membrane comprises: decontaminating the membrane with buffered peracetic acid; compressing the membrane; and dehydrating the membrane, wherein processing the membrane provides a dense matrix. In some embodiments, the human membrane is skin, dermis, small intestine, small intestine submucosa, urinary bladder, pericardium, peritoneum, placenta amnion, chorion, umbilical cord, or fascia.

In another aspect, also described herein is a tissue graft comprising a processed human tissue or organ wherein processing the human tissue or organ comprises: decellularizing the tissue or organ; and decontaminating the membrane with buffered peracetic acid. In some embodiments, the tissue or organ is placenta, heart, lung, kidney, liver, blood vessel, nerve, tendon, ligament, skeletal muscle, smooth muscle, or bone.

In another aspect, also described herein is a tissue graft product comprising: a processed human fetal amniotic membrane comprising an amnion layer and a chorion layer, and a backing, wherein processing the human fetal amniotic membrane comprises: compressing or compacting the membrane, dehydrating the membrane; and securing the membrane onto a backing, wherein processing the membrane provides a dense matrix without a step of delaminating the amnion layer from the chorion layer.

In another aspect, also described herein is a tissue graft comprising a processed human fetal amniotic membrane comprising an amnion layer and a chorion layer, and a backing wherein processing the human fetal amniotic membrane comprises: decontaminating the membrane with buffered peracetic acid; compressing or compacting the membrane; dehydrating the membrane; and securing the membrane onto a backing, wherein processing the membrane provides a dense matrix without a step of delaminating or separating the amnion layer from the chorion layer.

In another aspect, also described herein is a tissue graft comprising a sterilized, decontaminated human fetal amniotic membrane comprising an amnion layer and a chorion layer wherein the two layers have not been delaminated, wherein the maternal decidua cells and cells from the trophoblast layer are removed from the membrane, and wherein the membrane is compressed and dehydrated into a dense matrix.

In another aspect, also described herein is a tissue graft comprising a sterilized, decontaminated human fetal amniotic membrane and a backing, wherein the maternal decidua cells and cells from the trophoblast layer are removed from the membrane, and wherein the membrane is compressed and dehydrated into a dense matrix.

In another aspect, also described herein is a tissue graft comprising a sterilized, decontaminated human membrane and a backing, and wherein the membrane is compressed and dehydrated into a dense matrix.

In another aspect, also described herein is a tissue graft comprising a sterilized, decontaminated human fetal amniotic membrane comprising an amnion layer and a chorion layer wherein the two layers have not been delaminated, wherein the maternal decidua cells and cells from the trophoblast layer are removed from the membrane, wherein the membrane is compressed and dehydrated into a dense matrix, and wherein the membrane is folded. In some embodiments, the folded membrane has amnion layer on the outside of the folded membrane. In some embodiments, the folded membrane has chorion layer on the outside of the folded membrane. In some embodiments, the membrane is folded once. In some embodiments, the membrane is folded two to seven times.

In another aspect, also described herein is a tissue graft comprising a sterilized, decontaminated human fetal amniotic membrane comprising an amnion layer and a chorion layer wherein the two layers have not been delaminated, wherein the maternal decidua cells and cells from the trophoblast layer are removed from the membrane, wherein the membrane is compressed and dehydrated into a dense matrix, and wherein the membrane is rolled into a multilayer cylinder.

In another aspect, also described herein is a tissue graft comprising a sterilized, decontaminated human fetal amniotic membrane comprising an amnion layer and a chorion layer wherein the two layers have not been delaminated, wherein the maternal decidua cells and cells from the trophoblast layer are removed from the membrane by enzymatic treatment; wherein the membrane is treated with at least one enzyme; and wherein the membrane is compressed and dehydrated into a dense matrix.

In another aspect, also described herein is a tissue graft comprising a sterilized, decontaminated human fetal amniotic membrane comprising an amnion layer and a chorion layer wherein the two layers have not been delaminated, wherein the maternal decidua cells and cells from the trophoblast layer are removed from the membrane; wherein the membrane is compressed and dehydrated into a dense matrix; and wherein the membrane releases bioactives in a controlled or extended manner as compared to an uncompressed membrane. In some embodiments, the release of bioactives is extended over at least 3 to 14 days. In some embodiments, the release of the bioactives is extended over at least 3, 4, 5, 6, 7, 8, 9, 10, 11, 12, 13, 14, 15, 16, 17, 18, 19, 20, 21, 22, 23, 24, 25, 26, 27, 28, 29, or 30 days.

In another aspect, also described herein is a tissue graft comprising a sterilized, decontaminated human tissue and a backing, wherein the backing comprises at least two tabs configured to secure the tissue graft.

In another aspect, also described herein are methods of preparing a tissue graft comprising: removing maternal decidua cells and cells from the trophoblast layer from a human fetal amniotic membrane; compressing the membrane; and dehydrating the membrane; wherein the membrane results in a dense matrix and the amnion and chorion layers are not delaminated or separated.

In another aspect, also described herein are methods treating a wound on a patient comprising: applying to the wound, a tissue graft comprising a human fetal amniotic membrane comprising an amnion layer and a chorion layer wherein the two layers have not been delaminated or separated, wherein the membrane is prepared by a process comprising maintaining the membrane so that the amnion and chorion layers are not delaminated; removing maternal decidua cells from the membrane; and compressing and dehydrating the membrane to result in a dense and compact matrix.

In another aspect, also described herein are methods treating a wound on a patient comprising: applying to the wound, a tissue graft comprising a sterile, decontaminated human fetal amniotic membrane comprising an amnion layer and a chorion layer wherein the two layers have not been delaminated from each other, wherein the maternal decidua cells and cells from the trophoblast layer are removed from the membrane, and wherein the membrane is compressed and dehydrated into a dense matrix.

In another aspect, also described herein, are methods of enhancing recovery following cardiac surgery on a patient comprising: applying to a cardiac area, a tissue graft comprising a human fetal amniotic membrane comprising an amnion layer and a chorion layer wherein the two layers have not been delaminated, wherein the membrane is prepared by a process comprising maintaining the membrane so that the amnion and chorion layers are not delaminated; removing maternal decidua cells from the membrane; and compressing and dehydrating the membrane to result in a dense and compact matrix.

In another aspect, also described herein, methods of minimizing damage to the cardiovascular system caused by a myocardial infarction in a patient comprising: applying to a cardiac area, a tissue graft comprising a human fetal amniotic membrane comprising an amnion layer and a chorion layer wherein the two layers have not been delaminated, wherein the membrane is prepared by a process comprising maintaining the membrane so that the amnion and chorion layers are not delaminated; removing maternal decidua cells from the membrane; and compressing and dehydrating the membrane to result in a dense and compact matrix.

In another aspect, also described herein are apparatuses for compressing and dehydrating a tissue, comprising: a chamber defining an opening at one end, the chamber being in fluid connection with a vacuum source; a support platform covering the opening of the chamber; and a sealing sheet positioned adjacent the perforated support platform opposite the chamber, the sealing sheet being configured to seal the chamber upon depressurization of the chamber by the vacuum source, wherein the apparatus is configured to receive the tissue between the support platform and the sealing sheet, such that the tissue is dehydrated by depressurization of the chamber.

In some embodiments, the support platform comprises a perforated rigid support layer and a moisture, liquid, and vapor permeable material layer, the moisture, liquid, and vapor permeable material layer being positioned opposite the chamber. In some instances, the perforated rigid support layer comprises a sheet having a plurality of apertures therethrough. In some instances, the perforated rigid support layer is stainless steel, titanium, aluminum, or other suitable metal or a rigid plastic. In some instances, the moisture, liquid, and vapor permeable material layer comprises a porous polypropylene sheet with pores of from about 50 micron to about 200 micron.

In some embodiments, the sealing sheet comprises a gas impermeable, compliant or conformable polymer sheet. In some embodiments, the sealing sheet comprises silicone.

In some embodiments, the apparatuses further comprise an air source in fluid connection with the chamber and configured to deliver air to the sealed chamber, to augment the dehydration of the tissue. In some instances, the air source is an inert gas. In some instances, the air source is nitrogen, argon, helium, or carbon dioxide.

In some embodiments, the chamber contains a desiccant material. In some instances, the desiccant material is activated alumina, aerogel, benzophenone, bentonite clay, calcium chloride, calcium sulfate, cobalt(II) chloride, copper (II) sulfate, lithium chloride, lithium bromide, magnesium sulfate, magnesium perchlorate, potassium carbonate, potassium hydroxide, silica gel, sodium, sodium chlorate, sodium chloride, sodium hydroxide, sodium sulfate, sucrose, or combinations thereof.

In some embodiments, the apparatuses are configured without a heating element.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Relevant features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 (right) depicts an exemplary histological cross section of human fetal tissue membrane after post-cell removal of maternal decidua cells and cells in the fetal trophoblast layer.

DETAILED DESCRIPTION OF THE INVENTION

The present disclosure relates to human placenta-derived tissue grafts that display high bioactives content and reduced or no alloantigenicity and display improved healing properties. As used herein, the term "bioactives" includes, but is not limited to, cell binding motifs, extracellular matrix (ECM) components, collagen, elastin, hyaluronic acid, laminin, vimentin, fibronectin, growth factors, glycosaminoglycans (GAGS), proteoglycans, proteases, collagenases, gelatinases, protease inhibitors, cytokines, matricryptins, matrikines, ground substance components, and the like. The placenta-derived wound coverings described herein, in some embodiments, also display improved handling and performance properties, such as compactness, flexibility, suture retention, and resistance to enzymatic attack, slower or extended release of bioactives, and longer residence time at a wound or other implantation sites.

While the present disclosure refers to the use of these tissue graft products as "wound coverings" or "tissue grafts," it should be understood that the use and applications of such grafts are not limited to the treatment of wounds. Rather, these tissue graft products are contemplated for use in a variety of applications and treatments, including but not limited to use as anti-adhesion barriers, or for use in a variety of surgical procedures from closures to suspensory slings as well as to reduce atrial fibrillation post cardiac surgery or reduces pathogenic cardiac remodeling and scarring after myocardial infarction, as is discussed in greater detail herein. It is also contemplated that the tissue grafts products are used in scaffolding for tissue and organ regeneration, as an enhanced environment for stem cell attachment and function, and the like.

Figure 1:
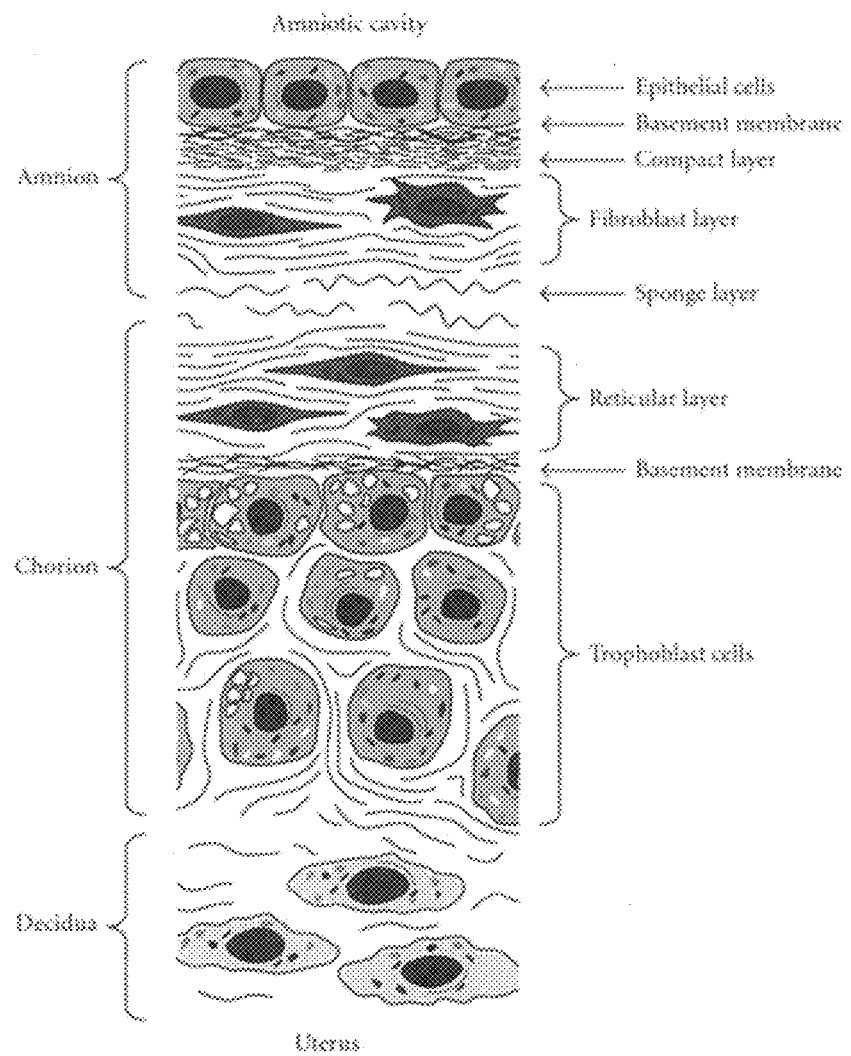
FIG. 1 depicts a cross section of a placental tissue with its primary two layers of amnion and chorion tissue. (Adapted from FIG. 2 of Uchide et al., "Possible Roles of Proinflammatory and Chemoattractive Cytokines Produced by Human Fetal Membrane Cells in the Pathology of Adverse Pregnancy Outcomes Associated with Influenza Virus Infection," Mediators of Inflammation, Vol. 2012.)

Generally, as shown in FIG. 1 (adapted from FIG. 2 of Uchide et al., "Possible Roles of Proinflammatory and Chemoattractive Cytokines Produced by Human Fetal Membrane Cells in the Pathology of Adverse Pregnancy Outcomes Associated with Influenza Virus Infection," Mediators of Inflammation, Vol. 2012), placental tissue has two primary layers of tissue amnion, chorion as well as a layer of maternal decidua. The amnion is the innermost layer of the placenta (i.e., the layer that faces the fetus), and consists of epithelial cells, a basement membrane composed of thin reticular fibers, a thick compact layer, and a fibroblast layer. The chorion is the maternal side of the placenta and consists of a reticular layer/basement membrane composed of a layer of dense connective tissue, and a trophoblast layer. The trophoblast layer of the chorion is in intimate contact with the maternal decidua of the uterine wall. An intermediate spongy layer connects the amnion and chorion layers.

It is contemplated that fetal membrane tissue grafts generally provide shorter time to wound closure and higher wound healing percentage by redirecting chronic, non-healing wounds into a healing pattern by promoting cell in-migration, proliferation, and differentiation, along with anti-inflammatory action and antimicrobial action. However, conventional placental tissue grafts, in some embodiments, display variable, decreased, or impeded retention of the bioactives thought to be critical or important to such healing, due to aggressive, harmful, and/or disruptive processing techniques. Therefore, placental processing that improves retention of such bioactives, including growth factors and other factors important to the promotion of wound healing, would provide improved wound healing properties of these products. The present disclosure therefore relates to processes and apparatuses for preparing tissue grafts while maintaining such critical bioactives, as well as the tissue grafts prepared therefrom and the use of such products in would healing and other treatments.

Additionally, many conventional placental processing techniques retain the maternal cells derived from the endometrium along with the fetal membrane as well as maternal cells within as the trophoblast layer of the chorion, all of which can produce an immune response in the recipient, stimulating activity of allogeneic lymphocytes, indicating presence of alloantigenicity, which in some cases results in a pro-inflammatory effect or graft rejection. As such, the present disclosure relates to processes and apparatuses for preparing tissue grafts in which at least a portion of the maternal decidua and trophoblast cells are removed, as well as the tissue grafts prepared therefrom and the use of such products in wound healing and other treatments.

Furthermore, due to harsh processing techniques and retention of the maternal cells, conventional placental tissue grafts typically are non-uniform in appearance and structure and brittle, or inflexible, in handling, making it difficult to effectively align and apply the product to a deep and/or uneven wound surface.

In certain embodiments, the tissue grafts of the present disclosure are room temperature stable (i.e., the products need not be cryopreserved, frozen, or refrigerated for stable transport and/or storage).

Tissue grafts and methods and apparatuses for preparing and using the same are described in greater detail below. Such tissue grafts in some embodiments display one or more superior handling/performance properties as compared to traditional placental tissue grafts, such as compactness, flexibility, suture retention, enhanced stability, extended shelf life, high bioactives content, reduced alloantigenicity, resistance to enzymatic attack, slower or extended release of bioactives as compared to commercially available tissue grafts, longer residence time at a wound or other implantation sites, and/or improved healing. As will be discussed, such superior properties in some embodiments are related to or achieved by one or a combination of the following processing features of the disclosed tissue grafts maintenance of the native bilayer architecture of the amnion and chorion throughout processing and in the resulting tissue graft, removal of maternal exogenous cells from the tissue, decontamination while limiting or avoiding the leaching of bioactives, application of pressure to the tissue during drying, dehydration of the tissue, processing or packaging the tissue such that the faces of the tissue graft are visibly distinguishable from one another, and terminal sterilization of the tissue graft.

Tissue Grafts & Methods for Preparing Placental Tissue Grafts

Tissue Procurement & Transport

Placental tissue is obtained from donated placenta, and in some cases, is harvested after Caesarean section or vaginal birth. In certain embodiments, the placental tissue is obtained from a donated placenta harvested from a birth at or after 36 weeks of gestation, such as prior to 39 weeks of gestation. In other embodiments, placental tissue from a premature birth, i.e., prior to 36 weeks of gestation, is used; however, the amounts of bioactives and enzymes in such tissue, in some cases, differ from tissue from a placenta at or after 36 weeks of gestation. In certain embodiments, donated placentas are screened to exclude those from certain donors such as those with gestational diabetes.

In certain embodiments, the donated placenta is harvested, chilled, and rinsed, then placed in a container for shipping to the tissue processing facility. In some embodiments, the harvested, donated placenta is chilled and then rinsed. In some embodiments, the harvested, donated placenta is rinsed and then chilled. In some embodiments, the harvested, donated placenta is chilled for transport and rinsed at the tissue processing facility. In some embodiments, the membrane is left attached to the placenta during rinsing and shipping. In another embodiment, the membrane is dissected away from the placenta at the acquisition site, and then processed as described below with reference to processing the placenta. Removal of the membrane at the placenta acquisition site advantageously decreases the amount of material to be shipped, providing easier control of the material. However, if the membrane is shipped without the placenta, it should be placed on a backing or other structure to stabilize the tissue in its native structure and prevent shear of the membrane layers or their configuration.

Tissue Processing—Removal of Maternal Cell Matter

Placenta or placental membrane is provided to a processing facility, e.g., following procurement and shipping. In embodiments in which the placenta with membrane attached is provided, the membrane is removed from the placenta by gross dissection. In certain embodiments, the adherent area of amnion and chorion layers that is dissected from the placenta is from about 50 cm$^2$ to about 500 cm$^2$, or larger, depending on the size of the placenta. In some embodiments, the adherent area of amnion and chorion layers that is dissected from the placenta is from about 400 cm² to about 800 cm². In some embodiments, the adherent area of amnion and chorion layers that is dissected from the placenta is about 600+/−200 cm². In certain embodiments, the adherent area of amnion and chorion layers that is dissected from the placenta is from about 50 cm², about 100 cm², about 150 cm², about 200 cm², about 250 cm², about 300 cm², about 350 cm², about 400 cm², about 450 cm², about 500 cm², about 550 cm², about 600 cm², about 650 cm², about 700 cm², about 750 cm², or about 800 cm².

Figure 2:
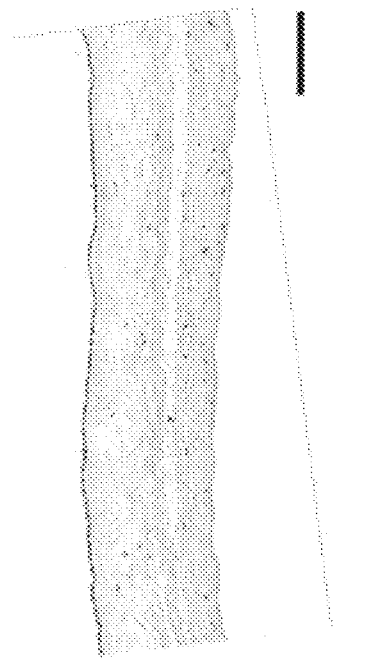
FIG. 2 (left) depicts an exemplary histological cross section of human fetal tissue membrane after post-shipping and post-dissection from the placenta and prior to removal maternal decidua cells and cells in the fetal trophoblast layer.
Figure 2:
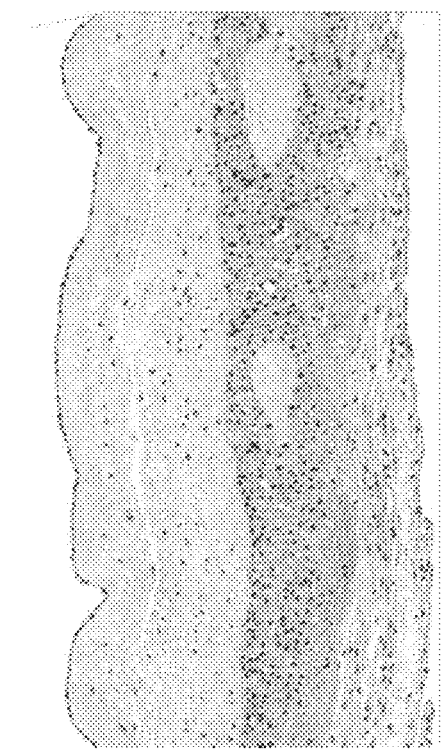

Thus, the human fetal (i.e., placental) tissue membrane at this stage (i.e., post-shipping and post-dissection from the placenta, but pre-processing) comprises the amnion, chorion, and maternal decidua/fetal trophoblast layers in the native, or natural, architecture, as shown in the pre-cell removal (left-hand side) histology of FIG. 2.

In certain embodiments, the human fetal support tissue membrane is then contacted with a hypotonic solution to osmotically swell the cell matter at the maternal side of the membrane. For example, the hypotonic solution, in some embodiments, is sterile water, a suitable saline solution, such as a hypotonic saline solution, or other biocompatible hypotonic solutions having an osmotic concentration of from about O to about 50 mOsm/L. It was discovered that if the tissue is exposed to hypertonic or isotonic solutions, as in some conventional placental tissue processing, the removal is more difficult and the chorion is more likely to be torn resulting in loss of bilayer tissue. The present methods, which instead involve contacting the placental tissue with a hypotonic solution, advantageously avoid the issues of separation and tearing of the amnion and chorion associated with the use of hypertonic/isotonic solutions when removing certain cells.

After the tissue membrane is contacted with the hypotonic solution to swell the cell matter on the maternal side of the membrane, the swollen decidua and trophoblast cell matter, in some embodiments, is then removed from the chorion connective, support tissue layer of the membrane to produce an isolated human fetal support tissue membrane which comprises amnion and the chorion tissue layers, in which amnion and chorion layers are in an original, undisrupted connective architecture, as shown in the post-cell removal (right-hand side) histology of FIG. 2.

For example, in some cases, removing the swollen decidua and trophoblast cell matter is performed by mechanical blunt removal or scraping, such as with a scalpel or other suitable instrument, and/or by manually peeling the swollen layers from the chorion. In certain embodiments, the step of removing the swollen trophoblast and decidua cell matter from the chorion results in removing substantially all of the trophoblast and decidua cell matter from the human fetal support tissue membrane. Thus, the resulting modified membrane, in some embodiments, includes the complete amnion layer, the reticular layer/basement membrane of the chorion layer, with the immunogenic maternal origin decidua and trophoblasts, which are fetal cells that, in some cases, also contain maternal cells (e.g., macrophages), substantially removed from the stromal collagen layer of the chorion. In certain embodiments, the step of removing substantially all of the trophoblast and decidua cell matter results in a non-antigenic human fetal support tissue membrane. Advantageously, the connective architecture of the amnion and chorion is maintained during this process, which is believed to provide beneficial mechanical and performance properties of the resulting products, as is discussed in more detail herein.

Figure 22:
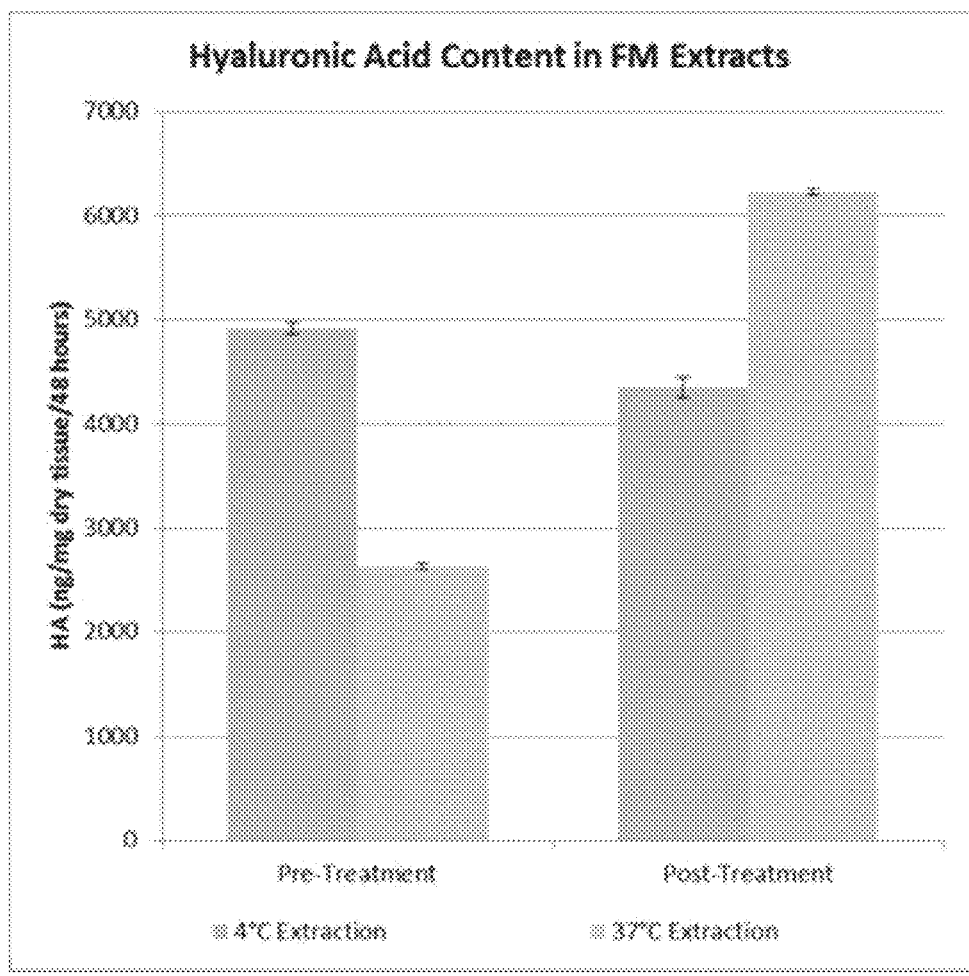
FIG. 22 shows the amount of hyaluronic acid released into extraction medium following sequential extractions, rocking at 4° C. and 37° C. for 48 hours each.

In other embodiments, the decidua and trophoblast cell matter is removed from the membrane by enzymatic degradation using a suitable enzyme. For example, in some embodiments, proteases are utilized to facilitate cellular dissociation either singly or in mixtures. Suitable enzymes include, but are not limited to, trypsin (a serine protease used for tissue dissociation), thermolysin, collagenase, and other metalloproteinases (which release cells by degradation of the structural protein collagen in the extracellular matrix), dispase (a neutral protease which cleaves amino terminal bonds of non-polar amino acids and digests fibronectin an extracellular matrix cell binding protein), hyaluronidase (degrades hyaluronic acid, a component of the extracellular matrix often found associated with collagen), papain (a cysteine protease that can be used to degrade extracellular matrix), elastase (a serine proteinase used to degrade the extracellular matrix of tissues with significant elastin content), and pronase (a mixture of proteolytic enzymes from Streptomyces griesus having varied specificities). In some embodiments, the decidua and trophoblast cell matter is removed from the membrane by a collagenase. In some embodiments, the trophoblast and decidua cell matter is removed from the membrane by a hyaluronidase. In some embodiments, the decidua and trophoblast cell matter is removed from the membrane by an elastase. It was observed in some embodiments that enzymatic degradation resulted in high levels of bioactives as compared to other types of removal of trophoblast and decidua cell matter from the human fetal amniotic membrane. FIG. 22 shows the amount of hyaluronic acid contained within the human fetal amniotic membrane before and after enzymatic treatment.

In other embodiments, the trophoblast and decidua cell matter is removed through use of divalent metal cation chelators that facilitate the removal of cells from the membrane. Suitable divalent metal cation chelators include, but are not limited to, ethylenediaminetetraacetic acid (EDTA), ethylene glycol tetraacetic acid (EGTA), and citrate buffers.

In other embodiments, the trophoblast and decidua cell matter is removed through use of a detergent. Exemplary suitable detergents include, but are not limited to, non-ionic detergents such as Triton X-100™, sodium dodecyl sulfate (SDS), and 3-[(3-cholamidopropyl)dimethylammonio]-1-propanesulfonate (CHAPS).

In some embodiments, combinations of these cell removal techniques are used. For example, in some embodiments, the decidua and trophoblast cell matter are removed by a hypotonic sterile water rinse and EDTA solution (e.g., approximately 10 mM), to separate the cell layer from the stromal collagen layer.

The present processing advantageously maintains the amnion and chorion layers of the fetal membrane in their natural, connective architecture, as shown in the post-cell removal (right-hand side) histology of FIG. 2, while also providing for removal of the decidua and trophoblast layers from the chorion. That is, unlike other placental membrane processing methods, the present process does not involve separation of the amnion from the chorion at any time, and thereby does not result in loss of the endogenous matrix components and possible damage to the membrane that occurs when the amnion and chorion are separated, which is believed to provide beneficial mechanical and performance properties of the resulting membranes. Accordingly, no reassembly or lamination of the amnion and chorion layers is required during any stage of processing. Thus, in embodiments, the present graft is not a structure formed by lamination. Rather, the natural anatomic bilayer relationship of the amnion and chorion layers is maintained from procurement of the tissue through application of the resulting tissue graft at a patient site.

Additionally, in conventional processes in which the amnion and chorion are separated, the intermediate spongy layer swells and beneficial glycosaminoglycans, as well as other biological components present in the spongy layer, are lost. Moreover, as will be discussed in more detail below, the layers of reassembled membranes (i.e., amnion and chorion that are laminated together after separation), in some embodiments, do not compact as tightly as the intact (non-separated fetal membrane) membranes.

Again, removal of the decidua is desirable because the decidua cells are present in their own matrix that is highly vascularized, making it susceptible to severe blood staining, the thickness of the decidua is highly variable and non-uniform (i.e., heterogeneous) in thickness, and local architecture across the membrane and between donors, and the decidua contains maternal cells of many types including inflammatory cells (leukocytes) and other cells (e.g., stromal fibroblasts and stem cells) as well as other cells that, in some cases, cause immunogenicity. Removal of the trophoblast layer is desirable because while this layer is of fetal origin, it also contains maternal inflammatory or immunogenic cells. Thus, tissue grafts prepared by the processes described herein have a greater uniformity of thickness (i.e., more homogeneous) and have no patches of discoloration or staining, resulting in homogenous appearance and handling. Additionally, maternal cells can present a potential for an antigenic response in the graft recipient. Maternal macrophages are often found within the decidua cell layer, further exacerbating the potential antigenic response of the decidua layer. In conventional processes, this issue is usually addressed by chemical treatment of the chorion layer or by complete removal of the chorion layer, or the issue is overlooked and the antigenic maternal cells are retained in the membrane. However, removal of the chorion to limit implant antigenicity results in the removal of important amounts of bioactive molecules from the tissue as well as leading to a thinner graft with less mechanical strength and increased potential for degradation. Without the chorion, bioactives can also elute or leach out of the amnion more rapidly.

In some embodiments, the epithelial cells of the amnion are removed, such as by enzymatic means as discussed above in reference to removal of the decidua. In other embodiments, the amnion is decellularized (i.e., the epithelial cells are removed) by any suitable chemical or physical means known in the art. In other embodiments, the complete amnion layer is maintained with the epithelium intact (i.e., the amnion is not decellularized).

Tissue Processing—Aseptic Conditions

In certain embodiments, the human fetal support tissue membrane is obtained and processed under aseptic conditions, thereby not requiring a sterilization step. Aseptic conditions comprising aseptic technique is known by those of skill in the art and includes use of filtered airflow, such as a surgical suite or a laminar air flow cabinet; use of sterile tools, such as sterilized forceps, sterilized scalpels, sterilized scissors, sterilized pipettes, sterilized gloves; and use of sterile solutions and buffers that have been sterile filtered and/or autoclaved; amongst other methods known by one of skill in the art. Sterilizing techniques, include but are not limited to autoclaving, UV radiation exposure, gamma radiation exposure, rinsing in 70% alcohol, ethylene oxide, 10% bleach, and/or iodine solutions. Exemplary aseptic conditions for processing of a human fetal support tissue membrane comprises obtaining the human fetal support tissue in a sterile hospital environment, using sterile surgical tools, wearing sterile gloves, a face mask, hair cover, shoe covers, and sterile lab coat, and placing the human fetal support tissue membrane into a sterile container, such as a sterilized pouch, transporting the human fetal support tissue membrane to a facility with a laminar air flow cabinet that has been disinfected with 70% ethanol and/or UV radiation, and conducting the remaining processing steps in the decontaminated laminar air flow cabinet or other suitable decontaminated environment.

Tissue Processing—Decontamination

In certain embodiments, the human fetal support tissue membrane is decontaminated by contacting the membrane with a suitable disinfectant. In certain embodiments, the isolated human fetal support tissue membrane which comprises amnion and the chorion connective, supportive tissue layer, which amnion and chorion are in an original, undisrupted connective architecture, is contacted with a disinfecting concentration of a suitable disinfectant. The disinfectant is used, in some embodiments, to decontaminate the tissue such that the bioburden is reduced to undetectable levels, i.e., below the threshold of detection by an assay detecting microbial presence, while also reducing damage or loss of endogenous matrix components and bioactive factors. In some embodiments, the bioburden is reduced to zero.

In certain embodiments, the disinfectant is ethanol or peracetic acid. For example, in some embodiments, the ethanol is an aqueous solution of about 50 to about 100 percent ethanol, of about 65 to about 75 percent ethanol, or of about 70 percent ethanol (all by volume). The ethanol is selected to achieve particular tissue membrane properties, such as reduced water content, a less adherent chorionic side compared to aqueous solutions (e.g., adherence between chorion and plastic backing, such as LDPE), favorable handling properties (e.g., stiffness, robustness), and an unmeasurable bioburden allowing for a sterilization requirement of substantially lower dosage of ionizing radiation. For example, it was found that the use of ethanol at concentrations greater than 75%, by volume, results in a brittle tissue membrane product. Specifically, it was found that after drying the tissue in the drying process described below, tissue treated with ethanol from 75% to 100%, by volume, was stiff and brittle, as compared to tissue treated with lower concentrations of ethanol.

In some embodiments, the peracetic acid is buffered. Suitable buffering agents include but are limited to phosphate, HEPES, MOPS, TES, citrate, acetate, bicarbonate, PIPES, BES, or Tris buffers. In some embodiments, the buffered peracetic acid contains ethanol. In other embodiments, the buffered peracetic acid does not contain ethanol. In some embodiments, the buffered peracetic acid has a pH of from about 4.5 to about 7.5. In one embodiment, the buffered peracetic acid is an aqueous solution of at least 30 percent peracetic acid, by volume. It was discovered that buffering the peracetic acid to a neutral pH of 4.5 to 7.5 enables a higher retention of bioactive molecules (i.e., HGF, KGF, and TIMP-1) compared to non-buffered peracetic acid while still decontaminating the tissue.

In certain embodiments, decontaminating the tissue membrane involves contacting the membrane with disinfectant for a period of at least about 15 minutes. In certain embodiments, decontaminating the tissue membrane involves contacting the membrane with disinfectant for a period of about 15 minutes. In certain embodiments, the tissue is contacted with disinfectant more than once, e.g., for two periods of 15 minutes. For example, in some embodiments, it is beneficial to contact the tissue with disinfectant more than once because the tissue contains residual moisture from the prior processing steps.

In certain embodiments, other disinfectants, such as suitable antibiotics or surfactants are used. However, care should be taken to avoid delamination of the tissue layer, loss of bioactives, that can occur with both high processing temperatures (e.g., 37° C.) and long treatment time (e.g., 3 hours or more). Delamination as used herein refers to separation of the amnion tissue layer from the chorion tissue layer in the fetal membrane. Delamination does not refer to removal of certain cells in either the amnion tissue layer or the chorion tissue layer. Additionally, conventional surfactants, in some cases, undesirably lead to a reduction in bioactives or an alteration of the tissue layer structure, and/or they leave an unwanted residue on the tissue. Thus, it is possible that the ethanol and peracetic acid treatments described above could provide certain benefits over other such disinfecting processes. For example, decontamination using these ethanol and/or peracetic acid treatments minimizes or limits or prevent leaching of bioactives during the decontamination step. That is, preservation of bioactives present in the original amnion and chorion layers is achieved by decontaminating the tissue membrane using these ethanol and/or peracetic acid treatments.

The described decontamination step advantageously reduces the bioburden at or near the start of tissue processing to limit tissue damage during subsequent processing steps, while maximizing retention of endogenous bioactive constituents. Additionally, these steps achieve a reproducible low or undetectable bioburden level to allow reduction of terminal sterilization levels (i.e., in some cases, a less severe sterilization process is needed to effect the desired tissue membrane sterility). With proper handling or aseptic conditions, sterilization may not be necessary. In certain embodiments, processing of the membrane is conducted under aseptic conditions and no final decontamination steps are used.

Tissue Processing—Folding, Rolling, or Stacking

In certain embodiments, the human fetal support tissue membrane is folded, rolled, or stacked to create a tissue graft that is uniform on each side. This feature has the advantage that a user, such as a physician or a patient, does not need to rely upon a marking on the human fetal support tissue membrane in order to place it correctly to administer treatment. An additional advantage is that the human fetal support tissue membrane does not need to be marked or labeled during processing. In some embodiments, the human fetal support tissue membrane that is folded, rolled, or stacked has a higher density of therapeutic factors than a single layer human fetal support tissue membrane. In some embodiments, the human fetal support tissue membrane that is folded, rolled, or stacked has an amnion layer on each side. In some embodiments, the human fetal support tissue membrane that is folded, rolled, or stacked has a chorion layer on each side. In some embodiments, the human fetal support tissue membrane is folded. In some embodiments, the human fetal support tissue membrane is folded once. In some embodiments, the human fetal support tissue membrane is folded twice, three times, four times, five times, six times, or seven times. In some embodiments, the human fetal support tissue membrane is folded into a square. In some embodiments, the human fetal support tissue membrane is folded into a rectangle. In some embodiments, the human fetal support tissue membrane is folded into a triangle. In some embodiments, the human fetal support tissue membrane is folded into a shape corresponding to the area or tissue to be treated. In some embodiments, the human fetal support tissue membrane is rolled. In some embodiments, the human fetal support tissue membrane is folded or rolled along a diagonal of the human fetal support tissue membrane. In some embodiments, the human fetal support tissue membrane comprises at least two human fetal support tissue membranes stacked on top of each other such that the amnion layers face toward the center and the chorion layers face towards the outside of the tissue membrane. In some embodiments, the human fetal support tissue membrane comprises at least two human fetal support tissue membranes stacked on top of each other such that the chorion layers face toward the center and the amnion layers face towards the outside of the tissue membrane. In some embodiments, at least three, four, five, six, seven, eight, nine, ten, eleven, twelve, or more human fetal support tissue membranes are stacked on top of each other with an amnion layer or a chorion layer facing toward the outside of the stacked human fetal support tissue membrane.

Tissue Processing—Dehydrating

In certain embodiments, the isolated human fetal support tissue membrane is dehydrated to a moisture content (used interchangeably with "water content" herein) of less than 20 percent by weight. As used herein, the term "dehydrated" refers to the tissue having decreased amount of water, water mixtures with miscible organic solvents, and/or non-aqueous solvents. For example, in some cases, the tissue membrane is dehydrated to a water content of less than 20 percent by weight, of less than 10 percent by weight, or less than 5 percent by weight. Particular apparatuses and methods of dehydrating tissue are described in further detail below.

Figure 3:
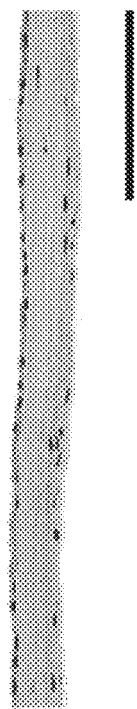
FIG. 3 depicts an exemplary histological cross section of human fetal tissue membrane prior to dehydrating and compressing (left) and post dehydrating and compressing (right).
Figure 3:
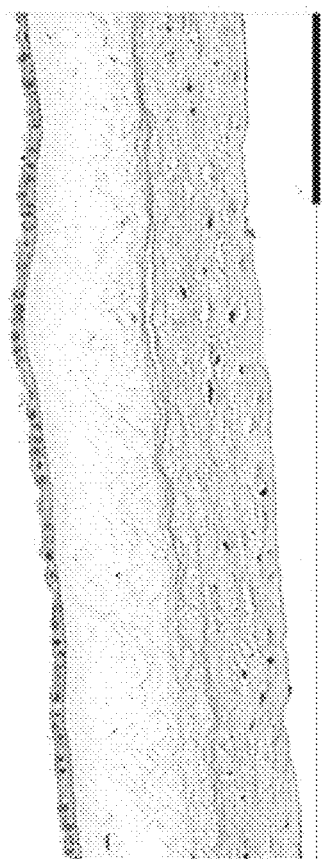

Dehydration (also referred to interchangeably as "drying" herein) of the tissue membrane, in some embodiments, advantageously extends the shelf life of the resulting tissue membrane product, enhances the adhesion between the membrane layers, and enhances the mechanical properties and handling properties of the tissue. As shown in the histology of FIG. 3, after drying (shown in right-hand side), the isolated tissue membrane is significantly more compact and dense than before drying (shown in left-hand side). As can be seen in FIG. 3, the hydrated (i.e., pre-drying) membrane has a visible anatomical distinction between amnion and chorion layers, while the dehydrated (i.e., post-drying) membrane has very little visible anatomical distinction between the layers (i.e., it is histologically difficult to differentiate the layers using conventional techniques).

It has been found that decreasing the moisture content of the tissue membrane to less than 20 percent by weight is important when balancing the biological activity of the endogenous bioactives with the desire for long-term storage at room temperature conditions. While it is traditionally believed that sterilization of a product of decreased moisture content lowers the recoverable content of bioactives, it was surprisingly found that decreasing the moisture content of the tissue membrane in fact resulted in more favorable stability of bioactives over time, as is discussed further in relation to sterilization of the tissue membrane.

In some embodiments, the dehydrating step involves dehydrating the isolated human fetal support tissue membrane in a desiccator chamber. In some embodiments, as discussed in greater detail below, the dehydrating step involves positioning the isolated human fetal support tissue membrane between a support platform and a sealing sheet, the support platform covering an opening of a chamber, and depressurizing the chamber, such that the sealing sheet seals the chamber, to dehydrate the isolated human fetal support tissue membrane.

In certain embodiments, the drying step involves embossing or otherwise imparting a visibly distinguishing surface characteristic to at least one surface of the tissue membrane, to facilitate determination of the amnion surface versus chorion surface, for example by the physician handling the tissue membrane product in the process of applying it to a tissue site of a patient.

Tissue Processing—Compressing

In certain embodiments, the isolated human fetal support tissue membrane is compressed to substantially collapse the tissue membrane and reduce its void spaces, i.e., open volume. The isolated human fetal support tissue membrane is, in certain embodiments, compressed to have an open volume of less than 15 percent, of less than 10 percent, or less than 5 percent. In certain embodiments, the compression comprises compaction. It is contemplated that the compact, collapsed nature of the tissue membrane advantageously provides a resistance to enzymatic breakdown and release of bioactives from the membrane, resulting in longer graft residence time in a wound and less product required to heal.

In certain embodiments, the compressed and dehydrated isolated human fetal support tissue membrane is a compact or dense matrix. As used herein, the terms "compact" and "dense" are used interchangeably and refer to the compressed and dehydrated isolated human fetal support tissue membrane being substantially collapsed and substantially free of voids. In certain embodiments, the tissue membrane is substantially nonporous. As used herein, the term "nonporous" refers to the compressed and dehydrated isolated human fetal support tissue membrane having substantially no visible open volume or space, as determined via histological analysis.

In some embodiments, the compression is from positive pressure exerted onto the tissue membrane. In other embodiments, the compression is from negative pressure, e.g., from a vacuum assisted apparatus as described below.

Tissue Processing—Sizing and Packaging

In certain embodiments, the dehydrated and compressed tissue membrane is cut to a desired size and then packaged. For example, in some embodiments, the tissue membrane is cut to size using a scalpel, scissors, a die (e.g., a pneumatic die), punch, or other suitable cutting tool before packaging the tissue membrane in a suitable packaging. In some cases, the tissue membrane is packaged in an air- and moisture-impermeable package. In some cases, the tissue membrane is packaged in an air- and moisture-permeable package.

Because accurate sizing the hydrated membrane is difficult and, in some cases, results in pieces that are not uniform, the present method advantageously sizes the dehydrated membrane. In particular, manual cutting or cutting using a press, in some cases, causes an unequal strain on the amnion and chorion layers, resulting in a lengthening of the amnion layer at the cut edges, if the membrane is cut while hydrated. Cutting the membrane after dried therefore allows for sizing the membrane to reproducible dimensions (e.g., 2 cm squares, 6 cm squares).

In certain embodiments, the tissue membrane is packaged in a pouch, such as a pouch having one side that is flashspun high-density polyethylene (HDPE, e.g., Tvyek®, manufactured by DuPont) and one side that is low-density polyethylene (LDPE). In some embodiments, this pouch is placed within a moisture resistant outer pouch. In some embodiments, this pouch is placed within a moisture permeable outer pouch.

As will be discussed in greater detail below, the tissue membrane, in some embodiments, is placed onto a backing material either during the drying process or after the drying process. For example, the backing material, in some embodiments, is a nylon mesh, flashspun high-density polyethylene (HDPE, e.g., Tvyek, manufactured by DuPont), or low-density polyethylene (LDPE) material.

In other embodiments, the dehydrated tissue membrane is micronized or otherwise further processed or packaged for uses other than as a planar tissue graft.

In preparation of the tissue membranes described herein, the packaging of the tissue membrane is, in some embodiments, carried out in an environment containing an inert gas, i.e., under inert packaging conditions, to lower the moisture and oxygen concentration in the packaging. Under inert packaging conditions also include the use of flushing or blanketing a packaging container (e.g., pouch) with an inert gas. The use of an inert gas (e.g., nitrogen, argon, $CO_2$, helium, xenon, neon and the like) limits exposure of the tissue membrane to moisture and oxygen and possible degradation. Moreover, packaging the dehydrated tissue membrane under an inert atmosphere, such that the moisture content is maintained at a low level, in some cases, advantageously allows for terminal sterilization without detectable reduction of bioactives content, such as growth factors.

Tissue Processing—Terminal Sterilization

After packaging, in some embodiments, the tissue membrane is sterilized to minimize the risk of infecting the recipient and to reduce the burden of aseptic tissue processing. In certain embodiments, the tissue membrane is sterilized with radiation in an amount of from about 15 kGy to about 35 kGy, such as 25 kGy. In some embodiments, the tissue membrane is sterilized with radiation in an amount from about 22.5 to about 31.5 kGy. For example, in some embodiments, the radiation is e-beam or gamma radiation.

It was surprisingly found that sterilization with e-beam radiation in the range of about 15 kGy to about 35 kGy yielded sterile tissue with no quantifiable change in immunoassayable growth factors (i.e., the tissue membrane retains a majority of endogenous bioactives from the amnion and chorion after processing). It is contemplated that the low moisture content (i.e., dehydration level or extent of dehydration) of the packaged tissue membrane that is subjected to irradiation minimizes the amount of oxygen present in the packaged tissue membrane that, in some cases, damages bioactives during irradiation. Thus, no decrease in the amount of certain bioactives after to irradiation sterilization was observed, despite the conventional understanding that bioactives decrease during irradiation.

In certain embodiments, the sterilization is performed at a controlled temperature.

In other embodiments, other suitable sterilization methods are used, such as treating the membrane with supercritical CO2. peracetic acid, or ethylene oxide.

The membrane resulting from the processes described herein, in some embodiments, constitutes a dry, easy to store, and ready to use sheet. To this end, minimal processing methods (e.g., no separation of the amnion and chorion layers of the membrane) coupled with benign processing parameters are employed to maximize the concentration of endogenous bioactives in the implantable product. The method also includes the non-chemical or biochemical removal of maternal cells from the fetal membrane; these cells can produce an immune response in the recipient which is not desirable in a wound covering product. The resulting intact bilayer of amnion and chorion does not stimulate proliferation or other activity of allogeneic lymphocytes indicating lack of alloantigenicity. That is, the resulting intact bilayer of amnion and chorion displays no detectable antigenicity.

In certain embodiments, the sterilized tissue can be stored at room temperature (e.g., 25±10° C.) for up to six months. In certain embodiments, the sterilized tissue can be stored at room temperature for up to twelve months. In certain embodiments, the sterilized tissue can be stored at room temperature for up to 24 months. In certain embodiments, the sterilized tissue can be stored at room temperature for up to 5 years.

In certain embodiments, the aseptically processed, dry tissue, has not been sterilized and can be stored at room temperature (e.g., 25±10° C.) for up to six months. In certain embodiments, the aseptically processed, dry tissue can be stored at room temperature for up to twelve months. In certain embodiments, the aseptic, dry tissue can be stored at room temperature for up to 24 months. In certain embodiments, the aseptically processed, dry tissue can be stored at room temperature for up to 5 years.

Tissue Grafts & Packaged Tissue Grafts

Tissue grafts produced by the methods described herein are also provided. These tissue grafts, in some embodiments, display beneficial mechanical, handing, and performance properties, including flexibility/non-brittleness, compact structure, and maintained bioactives/growth factors. In certain embodiments, a tissue graft includes a dehydrated isolated human fetal support tissue membrane which contains amnion tissue and an associated chorion connective, supportive tissue layer, which amnion and chorion are in an original, native bilayer architecture, wherein the human fetal support tissue membrane is substantially free of trophoblast and decidua cell matter. In some embodiments, a tissue graft includes a dehydrated isolated human fetal support tissue membrane which contains amnion tissue and an associated chorion connective, supportive tissue layer in their anatomic bilayer configuration, wherein the human fetal support tissue membrane is substantially free of maternal cells and is in a dense, compact collagenous and glycosaminoglycan matrix form.

In some embodiments, the amnion may maintain the epithelium. In some embodiments, the amnion is de-epithelialized. Advantageously, the tissue grafts retain the spongy layer connecting the amnion and chorion, which is believed to contribute to beneficial characteristics of the grafts, such as flexibility and the ability to achieve a compact structure during drying and compressing steps as well as retaining significant amounts of glycosaminoglycans such as hyaluronic acid.

Additionally, the present methods provide a solution to the problem of competing processing goals to achieve retention of growth factors and a tissue that can be stored at room temperature. Specifically, the present methods are designed to exploit the intrinsic value of the fetal membrane and to maximize retention of bioactives in the processed tissue and to reduce the antigenicity of that tissue, while preserving the connective structure of the native membrane (i.e., without laminating previously separated amnion and chorion layers together).

In certain embodiments, the dehydrated isolated human fetal tissue membrane retains effective levels of bioactives from the amnion, chorion, and spongy layer between the amnion and chorion. That is, the levels of bioactives in the tissue membrane product are not be statistically different from that of the natural tissue from which the product is derived. In certain embodiments, the dehydrated isolated human fetal support tissue membrane retains a majority of endogenous bioactives from the amnion and chorion. In some embodiments, the dehydrated isolated human fetal support tissue membrane comprises basic fibroblast growth factor (bFGF) in an amount of at least 5,000 pg/mg, or in an amount of at least 10,000 pg/mg. In some embodiments, the dehydrated isolated human fetal support tissue membrane comprises hepatocyte growth factor (HGF) in an amount of at least 100 pg/mg or in an amount of at least 450 pg/mg. In some embodiments, the dehydrated isolated human fetal support tissue membrane comprises TIMP metallopeptidase inhibitor-I (TIMP-1) in an amount of at least 7,000 pg/mg, or in an amount of at least 10,000 pg/mg. In some embodiments, the dehydrated isolated human fetal support tissue membrane comprises hyaluronic acid (HA) in an amount of at least 5,000 ng/mg, or in an amount of at least 10,000 ng/mg. It is believed that this HA content is associated with the maintenance of the spongy intermediate layer between the amnion and chorion, and provides flexibility in the resulting product. Low HA content in conventionally processed tissue grafts is believed to result in brittleness.

In certain embodiments, the tissue graft is configured for use as a wound covering or implant, which, in use, is not antigenic. In certain embodiments, the tissue graft is configured for use as a wound covering and is stable at room temperature. In certain embodiments the tissue graft is configured for use as a wound covering or implant, which, in use, is contemplated to display a resistance to biodegradation at an implant site due to namely, in part, to its dense, compact structure and high content of protease inhibitors such as TIMP-1. In certain embodiments, the tissue graft is configured for use as a wound covering or implant, which, in use, acts a barrier to certain molecules, such as proteases and degradative enzymes. In certain embodiments, the tissue graft is configured to have a sufficiently small pore size (e.g., 0.2 µm) to act as a barrier to infectious agents, such as bacteria and fungi. In certain embodiments, the tissue graft is configured for use as a wound covering or implant, which, in use, permits release of low molecular weight growth factors into surrounding tissue. In certain embodiments, the tissue graft is configured for use as a wound covering or implant, which, in use, acts as a barrier to fluid flux, limiting dehydration of surrounding tissues (e.g., limiting wound dehydration). In certain embodiments, the tissue graft is configured for use as a wound covering or implant, which, in use, provides a release rate of bioactives including but not limited to growth factors (e.g., bFGF) that is slower than a release rate of bioactives from a non-compact tissue graft. In certain embodiments, the tissue graft is configured for use as a wound covering or implant, which, in use, provides increased hydrophobicity of the dense, compact structure of the tissue membrane, by limiting the hydration state of the tissue matrix and thereby increasing the effective concentration of bioactives and protease regulatory factors within the matrix.

In certain embodiments, the dehydrated isolated human fetal support tissue membrane has a water content of less than 20 percent by weight, such as a water content of less than 10 percent by weight, or a water content of less than 5 percent by weight.

In certain embodiments, a first face of the tissue membrane is shiny and an opposed second face of the membrane is relatively matte, such that the first and second faces of the tissue membrane are visibly distinguishable from one another. Such visibly distinguishable membrane faces, in some cases, facilitate determination of the chorion versus amnion faces of the tissue graft, to assist in proper orientation and placement of the tissue graft onto a patient in use. The shiny and relatively matte faces, in some cases, are established during the drying process, as is discussed in more detail below.

In certain embodiments, the tissue graft is room temperature stable, and is not cryopreserved or lyophilized. Thus, the tissue graft, in some embodiments, does not require special storage conditions other than room temperature conditions. The tissue grafts described herein therefore do not require thawing or rinsing prior to application to the wound environment, but also provide improved membrane handling properties. For example, the tissue graft is alternatively pre-wet before application to the wound or it is applied in the dry state then moistened.

In certain embodiments, the tissue graft is provided in the form of a flat sheet. For example, providing the tissue graft in a flat or planar form, in some cases, provides for improved Van der Waals adhesion of the membrane to a backing material. In other embodiments, the tissue graft is provided in the form of another suitable graft shape, including but not limited to a tube, a rod, a fragment, or a wedge. In other embodiments, the tissue graft is combined with other materials, such as amniotic fluid, cells including stem cells, pharmaceuticals, and the like.

Apparatuses and Methods of Dehydrating and Compressing Tissue

Apparatuses and methods of dehydrating and compressing tissue, such as fetal support tissue, are also provided herein. While the apparatuses and methods are generally described with reference to drying isolated fetal support tissue, it should be understood that the apparatuses and methods are used to dry a variety of tissues, including whole or partial placenta, pericardium, fascia, and peritoneum, among others.

In certain embodiments, the apparatuses and methods are used to dehydrate the tissue to a water content of less than about 20 percent by weight, such as less than about 10 percent by weight, to achieve the desired water content for storage, stabilization, or other purposes. In some embodiments, the apparatuses and methods are used to dehydrate the tissue to a water content of less than 5 percent by weight. These apparatuses and methods, in some cases, are further be utilized to achieve the desired dense, compact, or collapsed tissue structure. These apparatuses and methods also are used to achieve consistent planarity that is free of wrinkles to improve surgical handling and use.

In certain embodiments, a method of preparing a compact tissue membrane includes simultaneously compressing and dehydrating the tissue membrane to form a dehydrated, compact tissue membrane. For example, in some cases, compressing the tissue membrane involves positioning the tissue membrane on a support platform and pulling a vacuum across the platform and/or applying a load to a surface of the tissue membrane, such as the surface opposite any support platform.

Figure 6:
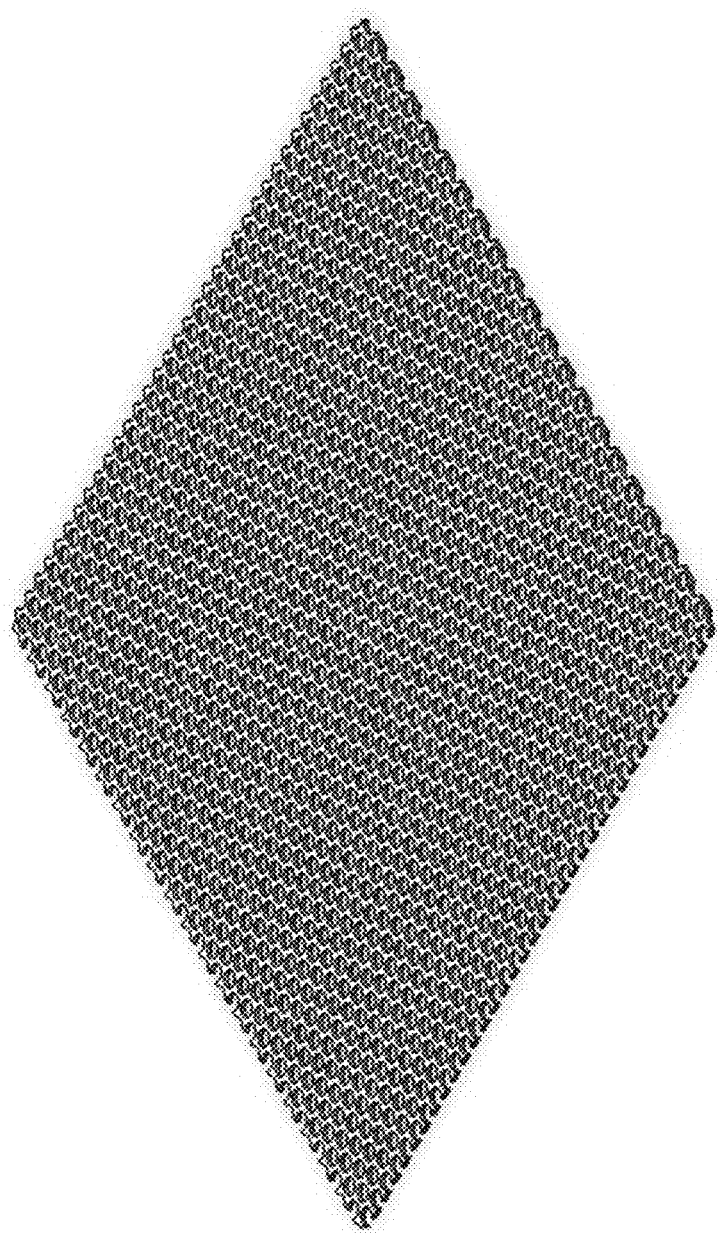
FIG. 6 depicts an exemplary perforated rigid support layer.
Figure 7:
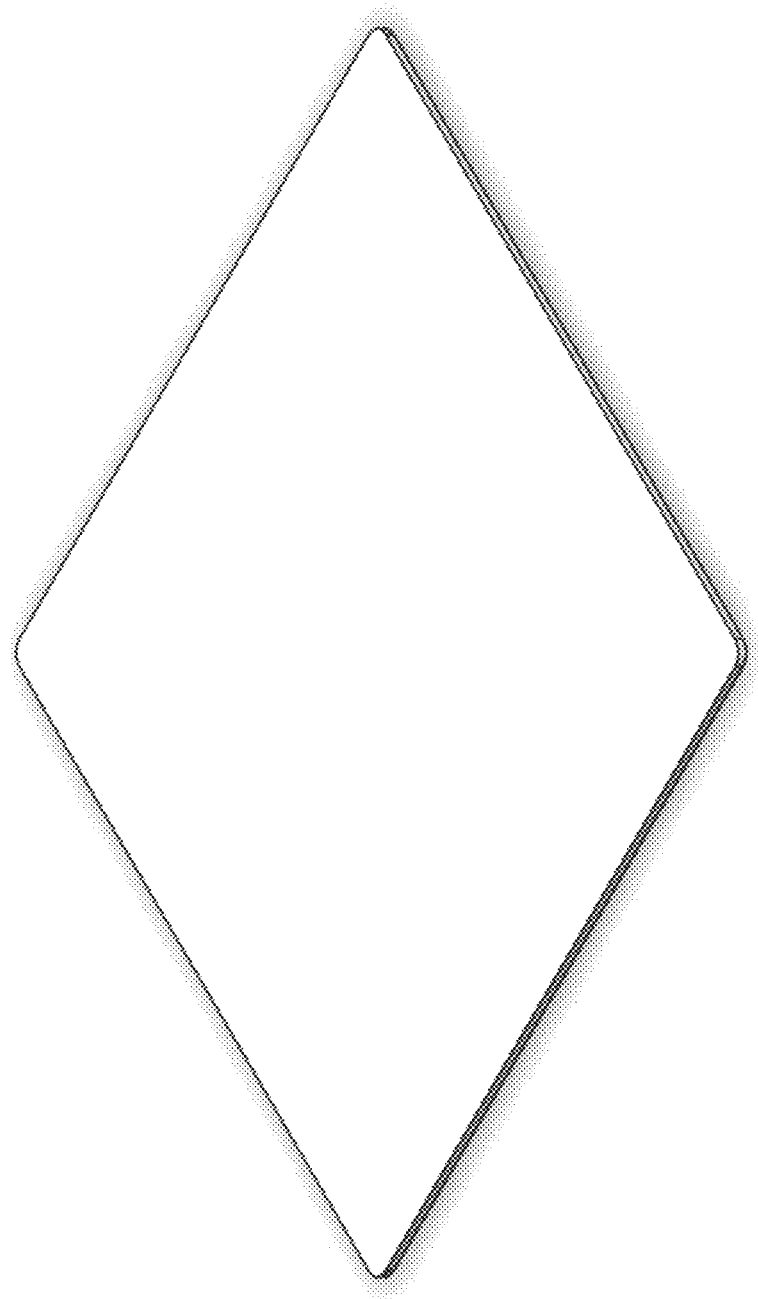
FIG. 7 depicts an exemplary moisture, liquid and vapor permeable material layer.
Figure 8:
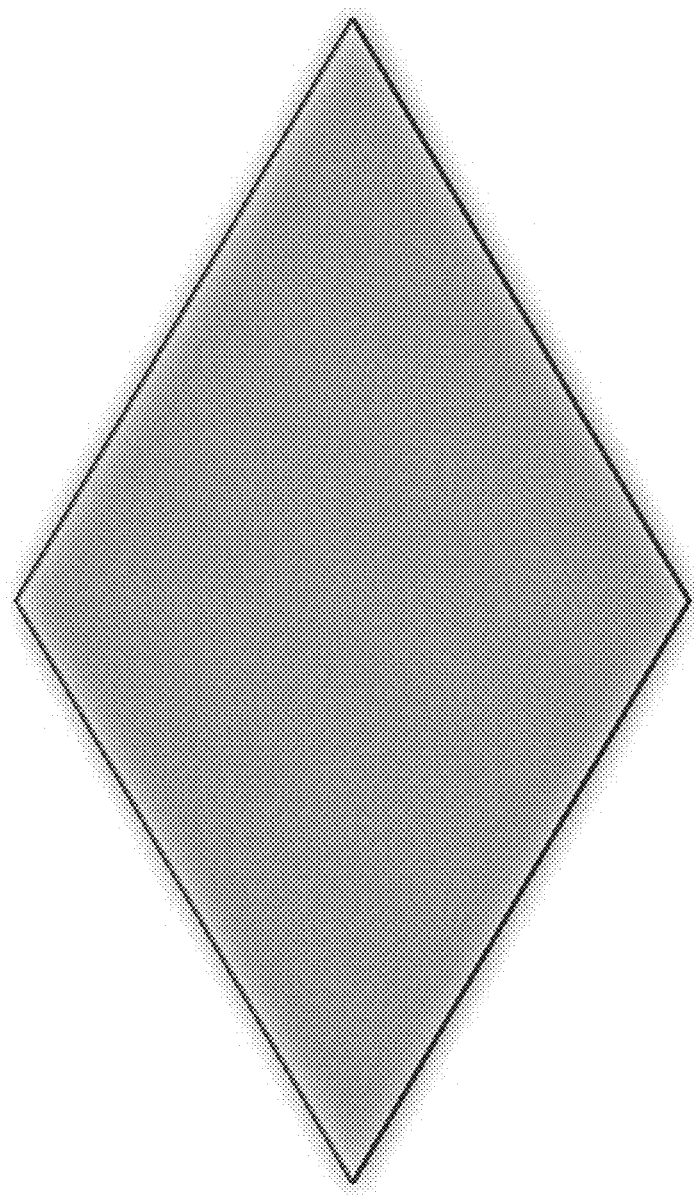
FIG. 8 depicts an exemplary sealing sheet.
Figure 21:
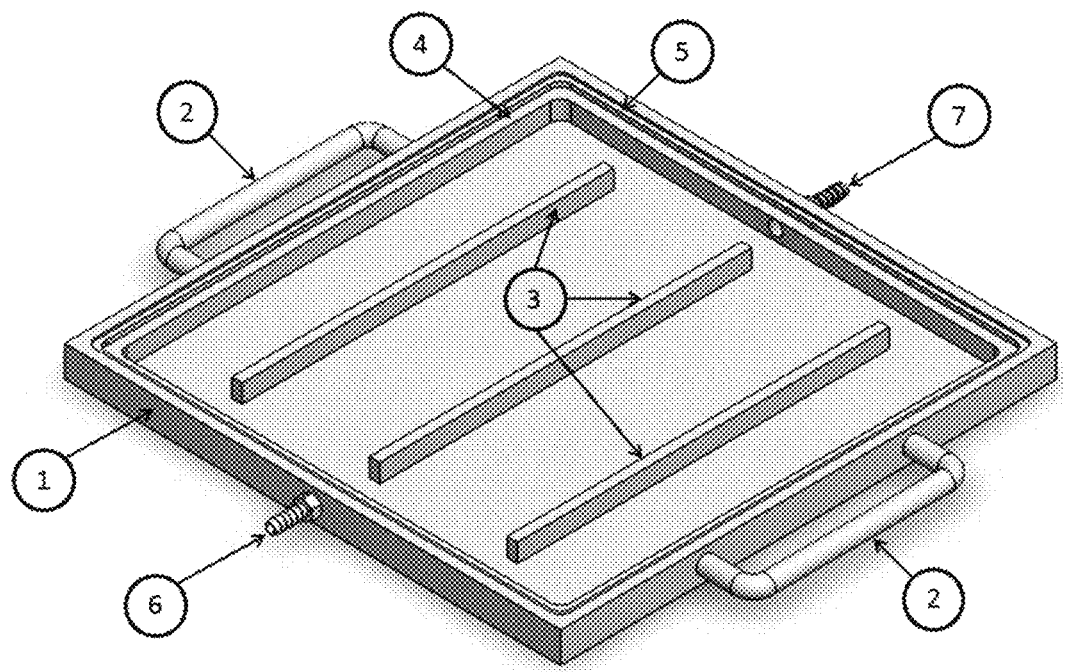
FIG. 21 shows an exemplary vacuum assisted drying apparatus: 1 Vacuum assisted drying apparatus, 2 handles for transporting apparatus, 3 ribbed supports, 4 lower ledge for holding support platform, 5 upper ledge for sealing, 6 vacuum outflow port, 7 air inflow port.

In certain embodiments, as shown in FIGS. 5-9 and FIG. 21, an apparatus 1 for dehydrating a tissue, includes a chamber defining an opening at one end, the chamber being in fluid connection with a vacuum source 6, a support platform comprising FIG. 6 and FIG. 7 covering the opening of the chamber, and a sealing sheet FIG. 8 positioned adjacent the support platform FIG. 6 and FIG. 7 opposite the chamber, the sealing sheet FIG. 8 being configured to seal the chamber upon depressurization of the chamber by the vacuum source 6. The apparatus is configured to receive the tissue between the support platform FIG. 6 and FIG. 7 and the sealing sheet FIG. 8, such that the tissue is dehydrated upon depressurization of the chamber. FIG. 21 further comprises an air inflow port 7.

For example, the opening of the chamber has an area that is at least the size of a tissue to be dehydrated (e.g., a 2 cm$^2$, a 6 cm$^2$, 10 cm$^2$, 20 cm$^2$, 30 cm$^2$, 40 cm$^2$, 50 cm$^2$, 60 cm$^2$, 70 cm$^2$, 80 cm$^2$, 90 cm$^2$, 100 cm$^2$, 150 cm$^2$, 200 cm$^2$, 250 cm$^2$, 300 cm$^2$, 350 cm$^2$, 400 cm$^2$, 450 cm$^2$, 600 cm$^2$, 650 cm$^2$, 700 cm$^2$, 750 cm$^2$, 800 cm$^2$, 850 cm$^2$, 900 cm$^2$, 950 cm$^2$, or 1000 cm$^2$). In some embodiments, the opening of the chamber has an area the size of an array of at least two tissue grafts to be dehydrated positioned in a side by side arrangement. For example, the chamber opening, in some embodiments, has an area of from about 2 cm$^2$ to about 1 m$^2$. For example, the chamber, in some embodiments, has a height from a base of the chamber to the opening of from about 2 mm to about 5 cm. The vacuum source 6, in some embodiments, is in fluid connection with this chamber such that the volume of the chamber is depressurized during dehydration. That is, the vacuum source is in fluid connection with the open space that extends across the chamber opening. For example, in some cases, the vacuum source is connected to the chamber via a vacuum port provided in a sidewall of the chamber.

In some embodiments, the support platform includes a perforated rigid support layer FIG. 6 and a moisture, liquid and vapor permeable material layer FIG. 7. The moisture, liquid and vapor permeable material layer FIG. 7 is positioned between the perforated rigid support layer FIG. 6 and the tissue to be dehydrated, and it functions to keep the tissue from being pulled into the perforations of the perforated rigid support layer FIG. 6 while also facilitating passage of moisture from the tissue through the perforations and into the chamber. In a preferred embodiment, the moisture, liquid and vapor permeable material layer FIG. 7 prevents the perforations of the perforated rigid support layer FIG. 6 from imparting their shapes to the surface of the dehydrated tissue, and instead keeps the surface of the dehydrated tissue relatively planar.

In other embodiments, the support platform may be a single structure that provides both the rigid structural support and suitable permeability, to accomplish the dehydration. In various embodiments, the single structure may be formed of a rigid woven or non-woven material, or a porous rigid sheet, which may be formed for example of a sintered metal, ceramic, polymer, or a composite thereof.

For example, the moisture, liquid, and vapor permeable material layer FIG. 7 may be any suitable material that is moisture, liquid, and vapor permeable, to allow moisture from the hydrated tissue to travel through the moisture, liquid, and vapor permeable material layer FIG. 7 upon depressurization of the chamber by the vacuum. In one embodiment, the moisture, liquid, and vapor permeable material layer is a porous polypropylene sheet with pores of from about 50 micron to about 200 micron. For example, the moisture, liquid, and vapor permeable material layer may be 0.125" thick polypropylene with 125-195 micron pores.

For example, the perforated rigid support layer FIG. 6 may be any suitable rigid support layer that allows for the passage of moisture and provides adequate structural support for the moisture, liquid, and vapor permeable material layer FIG. 7, tissue to be dried and sealing sheet FIG. 8, upon depressurization. In some embodiments, the perforated rigid support layer FIG. 6 is a stainless steel sheet having a plurality of apertures therethrough (e.g., 0.06" thick stainless steel with 0.25" diameter holes). In certain embodiments, the moisture, liquid, and vapor permeable material layer FIG. 7 is provided between the tissue and the perforated rigid support layer FIG. 6, to prevent embossing of the apertures of the rigid support layer FIG. 6 into the tissue.

In some embodiments, the sealing sheet FIG. 8 is a gas impermeable, compliant or conformable polymer sheet, such as a silicone sheet (e.g., 0.0625" thick, 12"×12" FDA-compliant or conformable silicone rubber) or an LDPE or polyurethane sheet. For example, upon depressurization of the chamber, the sealing sheet may create a sealed chamber. In other embodiments, the sealing sheet may have some degree of gas permeability, to provide limited air inflow.

In some embodiments, the apparatus optionally includes an air source 7 in fluid connection with the chamber and configured to deliver air to the sealed chamber, to further dehydrate the tissue by driving an exchange of moisture off the tissue. For example, the air may be a dry or pure inert gas, such as nitrogen, argon, or helium.

Figure 9:
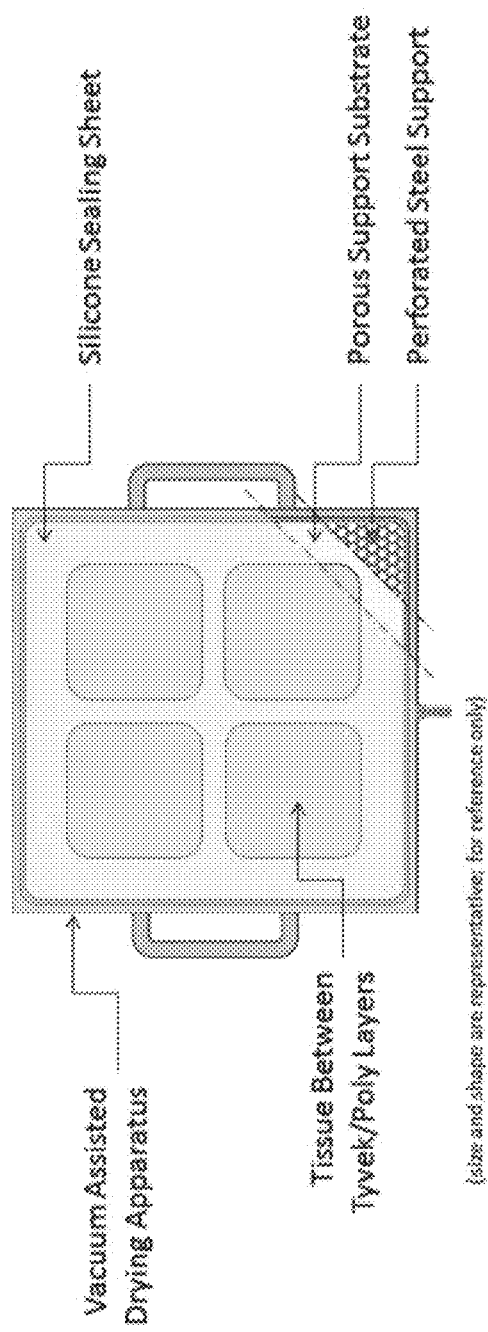
FIG. 9 depicts another view of an exemplary drying and compressing apparatus.

In some embodiments, the apparatus fully assembled as in FIG. 9 includes a perforated steel support, a porous support substrate and a silicone sealing sheet, with the tissue between Tyvek, polyethylene, and/or Poly layers.

In some embodiments, the chamber of the apparatus contains a desiccant material, such as silica gel (e.g., 2-5 mm diameter granules), to act as a moisture sink for moisture from the tissue.

While any suitable apparatus design providing suitable pressure on the tissue and depressurization to achieve dehydration of the tissue may be used, a particular embodiment is illustrated in FIGS. 5-9, and further includes handles 2 for transporting the apparatus, ribbed supports 3 and lower ledge 4 for holding the support platform FIG. 6 and FIG. 7, and the sealing sheet FIG. 8 off the chamber, and upper ledge 5 for vacuum sealing down the sealing sheet.

In certain embodiments, a method of dehydrating a tissue membrane includes positioning the tissue membrane between a support platform FIG. 6 and FIG. 7, and a sealing sheet FIG. 8, the support platform covering an opening of a chamber, and depressurizing the chamber, such that the sealing sheet FIG. 8 seals the chamber, to dehydrate the tissue membrane.

In some embodiments, the tissue membrane is an isolated human fetal support tissue membrane that has been decontaminated. For example, the tissue membrane may be dehydrated to a moisture content of less than 20 percent by weight.

In some embodiments, prior to positioning the tissue membrane between the support platform and the sealing sheet, but after decontamination, the tissue membrane is placed within a flexible pouch. In one embodiment, the flexible pouch has at least one side that is a nonwoven, flashspun, or other porous material (e.g., Tyvek®), such that the nonwoven, flashspun, or other porous material may be positioned in contact with the support platform FIG. 6 and FIG. 7, to provide for the flow of moisture from the tissue through the support platform FIG. 6 and FIG. 7. That is, the nonwoven, flashspun, or other porous material side of the pouch faces the support platform. In some embodiments, the tissue membrane is an isolated human fetal support tissue membrane and is positioned in the pouch with the amnion side of the tissue membrane facing the nonwoven, flashspun, or other porous material side of the pouch. In some embodiments, the tissue membrane is an isolated human fetal support tissue membrane and is positioned in the pouch with the chorion side of the tissue membrane facing the nonwoven, flashspun, or other porous material side of the pouch. In such embodiments, the pouch may be used to temporarily transport the tissue to and from the drying apparatus and to impart "shiny" and "dull" "matte" or "relatively matte" surface finishes to the tissue membrane, to allow for visual distinguishing of the two sides. In particular, the shiny surface may be imparted by the LDPE pouch side and the "relatively matte" surface may be imparted by the porous pouch side.

In certain embodiments, a second side of the pouch is formed of a moisture impermeable material, such as LDPE. In such embodiments, wherein the tissue membrane is an isolated human fetal support tissue membrane, the membrane is positioned in the pouch with the chorion side facing the LDPE. In some embodiments, the membrane is positioned in the pouch with the amnion side facing the LDPE.

In certain embodiments, after the tissue membrane is placed in the pouch, the excess edges of the pouch are cut away, so that the maximum number of pouched membranes may be placed between the sealing sheet and support platform to be dried simultaneously.

In certain embodiments, depressurizing the chamber involves operating a vacuum pump to draw at least about 10 inHg from the chamber, such as about 25 inHg from the chamber. In certain embodiments, the drying method optionally includes delivering air to the sealed chamber to further dehydrate the tissue membrane. For example, the air may be an inert gas, such as nitrogen, argon, or helium In one embodiment, inert gas is delivered to the chamber at a rate of from about 20 mL/min to about 4 L/min, such as at a rate of about 300 mL/min. In certain embodiments, depressurizing the chamber involves operating a vacuum pump, and delivering air to the sealed chamber occurs after operation of the vacuum pump, such that the depressurizing and air delivery does not occur simultaneously. In other embodiments, depressurizing and air delivery occur simultaneously.

In certain embodiments, the tissue membrane is maintained at the depressurized chamber (i.e., between the sealing sheet and the support platform) for a period of from about 16 to about 24 hours. After this drying step, the tissue has a compact, collapsed structure, and a moisture content of as low as 5 percent or less, by weight; however, the tissue may increase in moisture content after removal from the drying apparatus, if not maintained in a dry (or low humidity) room (or other vessel or location) e.g., in a dry, inert gas atmosphere.

In certain embodiments, after removal from the drying apparatus, the tissue may be dissected, or cut, to size. Cutting the tissue to size is discussed in more detail above. In certain embodiments, the tissue is cut to size using a scalpel and a stencil. In other embodiments, the tissue is cut to size using a pneumatic press and a die. During the cutting process, if not conducted in a dry room or inert atmosphere, the tissue may increase to a water content of up to about 15 percent, by weight. Thus, in certain embodiments, a second drying step may be required.

In some embodiments, the tissue membrane is removed from the sealed chamber and then, possibly after an intermediate cutting step, the tissue membrane is positioned in a desiccator chamber with a desiccant material and the desiccator chamber is depressurized. For example, depressurizing the desiccator chamber may involve operating a vacuum pump to draw at least about 10 inHg from the desiccator chamber, or operating a vacuum pump to draw about 25 inHg from the desiccator chamber. In some embodiments, the desiccant material is silica gel (e.g., up to about 100 g of silica gel). In some embodiments, the tissue membrane is maintained in the depressurized desiccator chamber for a period of at least 24 hours. In some embodiments, the tissue membrane is maintained in the depressurized desiccator chamber for a period of 12, 24, 36, 48, 60, 72, or more hours. In some embodiments, the tissue membrane is maintained in the depressurized desiccator chamber for a period of at least 24 hours.

In certain embodiments, the tissue membrane is releasably secured onto a backing material before or after some level of dehydration. For example, the tissue membrane may be releasably bonded onto the backing material during a drying process.

In certain embodiments, the tissue membrane is releasably secured on a flexible backing material comprising at least one tab defined by the flexible backing material, wherein the membrane is releasably secured on the flexible backing material via the at least one tab. The tissue membrane may be secured to the backing material between the first and second drying steps, i.e., after drying in the apparatus to form the compact structure and prior to secondary drying in the desiccator chamber. For example, the tissue membrane may be secured to the backing material after sizing. After being secured on the backing material, the backing material with secured tissue membrane may be placed in an unsealed pouch prior to secondary drying.

The secondary drying step, if needed, may bring the moisture content of the tissue to about 5 percent moisture, by weight. It is contemplated that a moisture content of 3 percent or less may result in brittleness of the dried tissue. Thus, a moisture content of up to 8 percent, or more, may be desired based on the necessary performance characteristics and shelf life.

In certain embodiments, either or both drying steps are performed at an elevated temperature.

Figure 4:
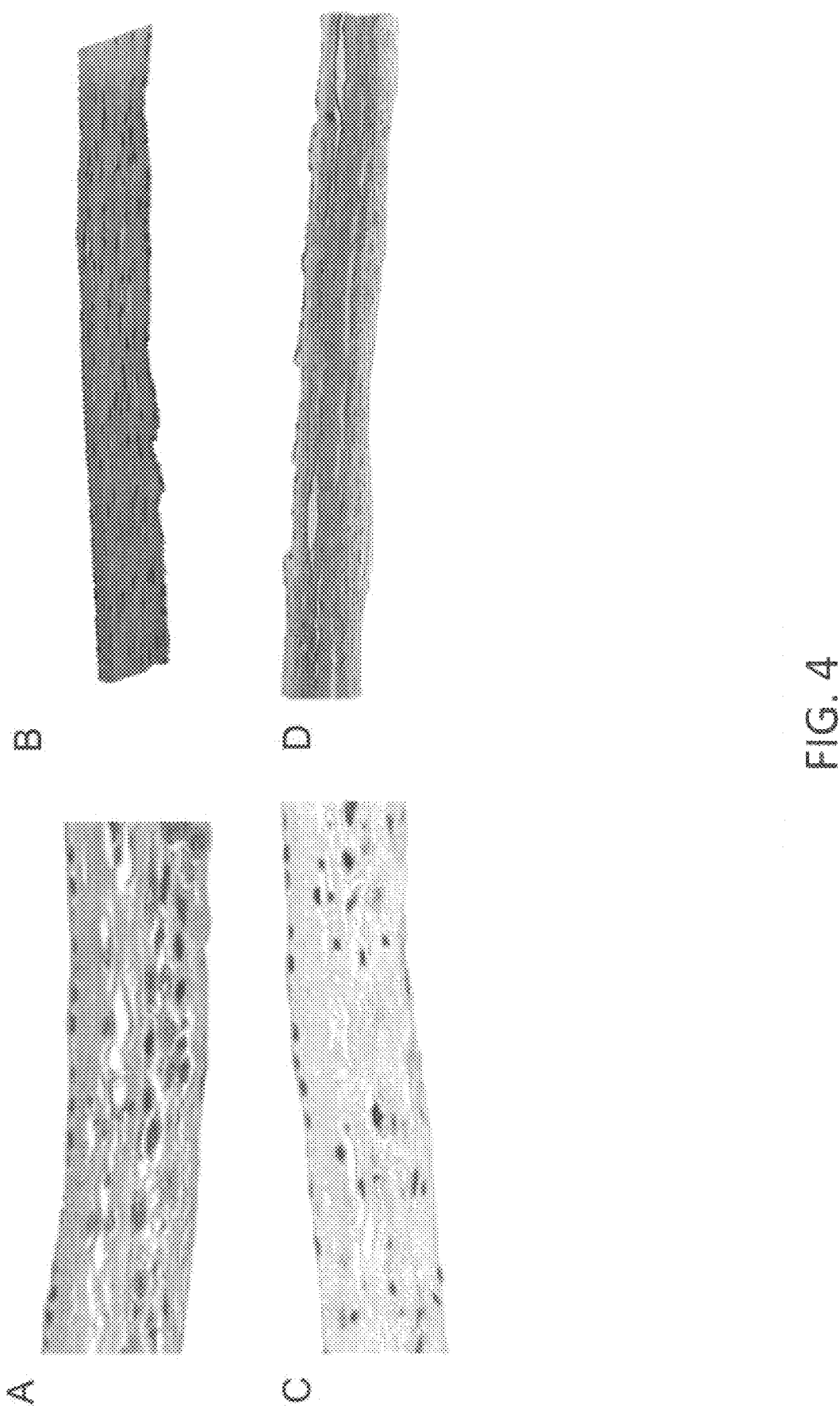
FIG. 4 shows a histological cross section of an exemplary human fetal tissue membrane graft (panels B and D) and a comparative commercial fetal tissue graft (panels A and C, adapted from Koob et al., J Biomed Mater Res B Appl. Biomater, 2014, 102(6) 1353-62) stained with hematoxylin and eosin (panels A and B) and Alcian blue (panels C and D).
Figure 5:
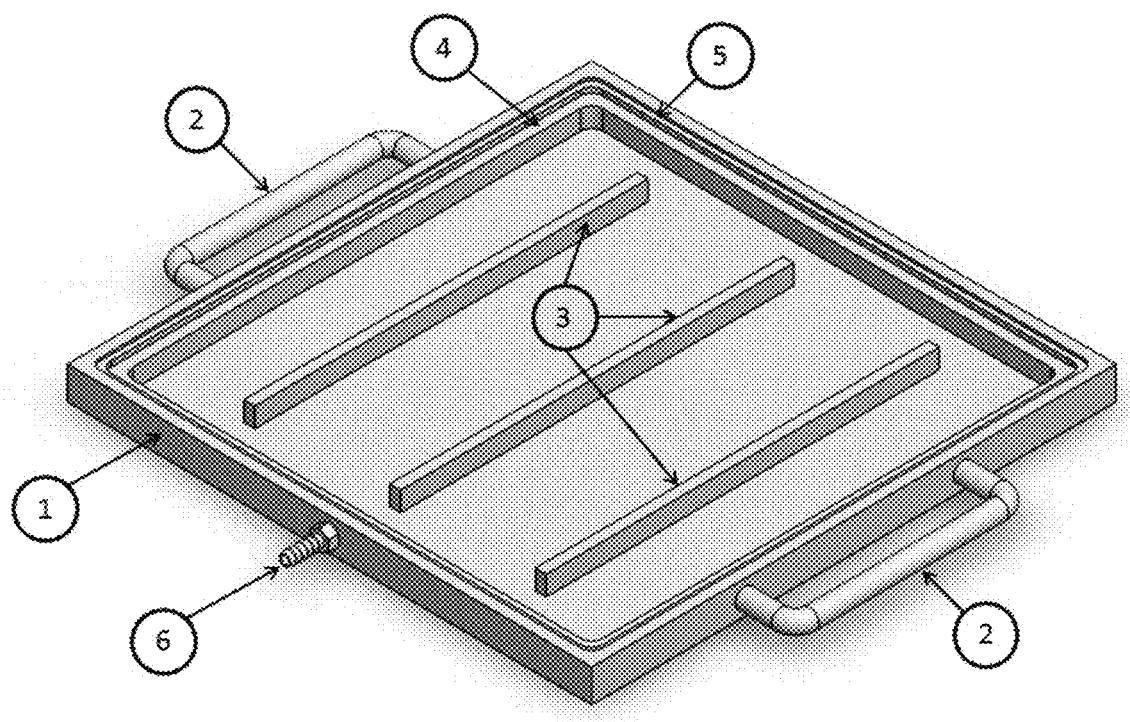
FIG. 5 depicts an exemplary vacuum assisted drying apparatus: 1 Vacuum assisted drying apparatus, 2 handles for transporting apparatus, 3 ribbed supports, 4 lower ledge for holding support platform, 5 upper ledge for sealing, 6 vacuum outflow port.

The above described drying apparatus and methods advantageously utilize vacuum pressure on the tissue and optional air flow below the tissue within a completely closed environment to produce a product that is compact, dry, and wrinkle free. It is believed that drying while imparting a force on one side of the tissue structure while also applying a vacuum at the opposed side of the tissue structure yields the collapsed tissue structure that has reduced porosity. Furthermore, the vacuum applies pressure and changes the histologic appearance of the tissue, such that no discernible layers (i.e., amnion/chorion) are apparent in the dried product. That is, the resulting membrane structure, while including the amnion and chorion in their native connective structure, is monolithic in appearance. Thus, compared to conventional drying methods in convection oven-like systems in which no force is applied to a surface of the tissue, the present methods result in a much more compact structure (see FIG. 4, comparative cross-section of tissue membranes dried in presently described apparatus (panels B and D) and commercial tissue graft (panels A and C)).

As discussed above, it is hypothesized that this structure reduces the rate of proteolysis and retards the elution of bioactives. Specifically, it is believed that the denser tissue structure allows extended delivery (i.e., diffusion based) of bioactives and extended life of the ECM in the wound bed because the compact structure is more resilient to enzymatic protease infiltration into the membrane system and the resulting degradation of matrix and bioactive molecules.

Additionally, the result of drying the tissue in between a nonporous, ultra-smooth material and a nonwoven yet porous material is a final product that is shiny on one side, relatively matte on the other, and completely planar. Moreover, the final water content achieved using sequential vacuum and desiccation steps yields a lower water content than is achieved from evaporation alone (i.e., consistently less than 10%). Thus, the tissue grafts dried using these apparatuses and methods display better handling properties due to their compact structure, as compared to laminated products and products dried through other methods.

Tissue Backing Material

In certain embodiments, the tissue material is secured onto a backing material for packaging the tissue and providing improved handling and maintenance of the planar tissue structure. Additionally, the backing may further help to identify the orientation of the tissue membrane, by providing a consistent orientation for secured tissue membranes (e.g., amnion faces out, away from backing) in addition to the optional shiny/relatively matte surface feature, to assist physicians in application of the membrane to a patient site.

Figure 10:
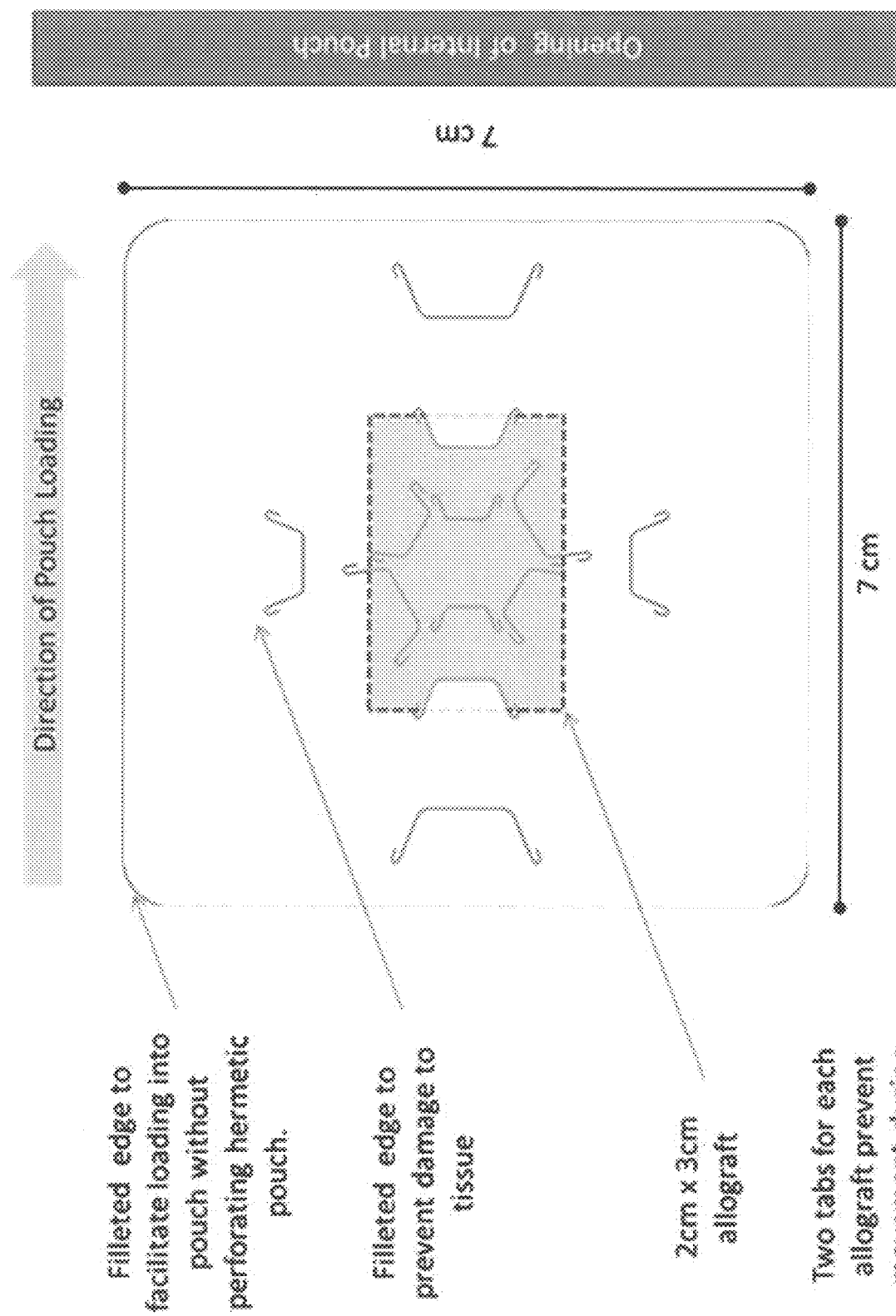
FIG. 10 depicts an exemplary flexible backing with multiple tabs cut into the flexible backing material to secure and hold various sizes of a tissue graft.

In certain embodiments, as shown in FIG. 10, a flexible backing material includes at least one tab defined by the flexible backing material (i.e., the tab is formed by a cut in the flexible backing material). In certain embodiments, the flexible backing material is a suitable medical grade flexible polymer material, such as high density polyethylene (HDPE), low density polyethlyene (LDPE), ethylene/vinyl alcohol copolymer (EVOH), polypropylene (PP), polyethylene terephthalate (PET). amorphous polyethylene terephthalate (APET), glycol modified polyethylene terephthalate (PET-G), polyethylene naphthalate (PEN), ethylene acrylic acid copolymer (EAA), polyamide (PA), polyvinyl chloride (PVC), polyvinylidene chloride (PVDC), polychlorotrifluoroethylene (PCTFE), vinylidene chloride/methyl acrylate copolymer, polyamide, polyester, polyurethane, silicone, a metalized film, an oxide coated film, nitrocellulose, and combinations thereof. In certain embodiments, the flexible backing material includes two opposed tabs configured to secure opposed ends of the tissue membrane on the backing material. For example, the tissue membrane may be rectangular in shape and a pair of opposed tabs may be provided in the backing material to secure opposed ends of the membrane to the backing.

In certain embodiments, a single backing contains multiple tabs for securing tissue membranes of various sizes thereon. As shown in FIG. 10, an exemplary single backing contains six pairs of opposed tabs, such that a tissue membrane may be secured by the pair of tabs having a distance therebetween that is slightly longer than the distance between the ends of the membrane to be secured. It is contemplated herein that a single backing contains, additional or fewer pairs of opposed tabs, for example one, two, three, four, five, six, seven, eight, nine, ten, or more pairs of opposed tabs, such that a tissue membrane may be secured. In other embodiments, a single backing contains one pair of tabs for securing a membrane having a particular size thereon.

In certain embodiments, the tabs are defined by a cut in the flexible backing material, such as a cut having filleted ends, which may prevent damage to the tissue membrane. In some embodiments, the tabs are integral with the backing material. In other embodiments, the tabs are a separate material from the backing material.

In certain embodiments, an isolated human fetal support tissue membrane having a water content of less than 20 percent by weight is mounted on a flexible backing material having at least one tab defined by the flexible backing material, wherein the membrane is releasably secured on the flexible backing material via the at least one tab. Thus, the tissue membrane may be mounted on the backing after a primary drying step (e.g., after drying in the apparatus discussed above). In some embodiments, the isolated human fetal support tissue membrane is releasably secured to the flexible backing material such that the chorion connective, supportive tissue layer contacts the flexible backing material and the amnion tissue is opposite the backing material. After the membrane is mounted on the backing material, the backing with secured membrane may be positioned within a pouch prior to terminal packaging or a second drying step.

It was determined that securing a dried membrane to the backing with tabs prevented the membrane from becoming adhered to the backing, as in conventional placental tissue grafts having a backing, which makes removal of the membrane from the backing easier. The flexible nature of the backing also allows for a physician to control the placement of the tissue membrane at a patient site and to facilitate separation of the tissue membrane from the backing, while avoiding contact with the tissue membrane itself. In some embodiments, the backing is larger than the tissue membrane, such that a gripping area is provided around the periphery of the tissue membrane, so that a user can avoid contact with the tissue membrane itself.

In certain embodiments, a packaged tissue graft includes a flexible backing material having at least one tab defined by the flexible backing material and a tissue membrane as described herein releasably secured on the flexible backing material via the at least one tab. In one embodiment, the flexible backing material extends at least ⅛ inch (3.175 mm) past the perimeter of the tissue membrane. In one embodiment, the chorion connective, supportive tissue layer contacts the flexible backing material, such that the amnion tissue is opposite the backing material.

The foregoing packaging systems (flexible backing and pouch) for a tissue membrane can be used with tissue grafts other than those derived from placental tissues. For example, it is envisioned that that packaging systems can be used with tissue grafts derived from fascial, pericardial, or peritoneal tissues or other similar natural sheet or sheets derived from organs such as heart, lung, stomach, intestine, bladder, skin and the like from human or other mammalian donors.

Applications and Methods of Use of Placental Tissue Grafts

The tissue grafts described herein may be used in a variety of medical applications, for example in wound covering and healing, as an anti-adhesion barrier, in regenerative medicine, and in post-operative atrial fibrillation, among others. Advantageously, the tissue grafts may be effective to redirect chronic, non-healing wounds into a healing pattern by promoting cell in-migration, proliferation, and differentiation, along with an anti-inflammatory action.

In particular, the tissue grafts may retain beneficial bioactives present in the placental tissue, including growth factors and cytokines that promote fibroblast proliferation and angiogenesis (bFGF) and epithelialization (KGF, HGF), anti-fibrotic/anti-inflammatory factors that inhibit expression of pro-inflammatory cytokines (IL-la, IL-2, IL-8, INF-Y, etc.) and/or protect from oxidative stress, and antimicrobial peptides, and may be effective to inhibit allo-reactive immune cells such as macrophages and proliferating T-cells. The tissue grafts may also include the ECM matrix, which beneficially provides a sacrificial matrix for endogenous wound bed proteases, contains hyaluronic acid, which suppresses TGF-fi signaling reducing proliferation of fibroblasts and limits the migration of inflammatory cells, and provides cell binding motifs that enable interstitial cell migration, adhesion, differentiation, de nova matrix synthesis, and proliferation.

In some embodiments, tissue grafts herein release bioactives for an extended period of time compared to commonly available or commercially available tissue grafts. For example, tissue grafts herein, in some embodiments, release bioactives for at least three days. In some embodiments, tissue grafts herein release bioactives for at least five days. In some embodiments, tissue grafts herein release bioactives for at least seven days. In some embodiments, tissue grafts herein release bioactives for at least 14 days, 21 days, 28 days, 30 days, or longer.

As a wound covering or for wound healing, the tissue grafts described herein may be used to treat chronic wounds, such as diabetic, venous, and arterial wounds, as well as acute non-healing wounds, such as surgical and injury-related wounds, and pressure ulcers. For example, the tissue grafts described herein may be used in the treatment of a diabetic foot ulcer or a leg ulcer. For example, the tissue graft described herein may be used in the treatment of foot and lower limb ulcers resulting from diabetes and peripheral vascular diseases. In certain embodiments, the tissue graft is applied to a wound area for a period of at least 7 days. In certain embodiments, the tissue graft is applied to a wound area for a period of at least 14 days. In certain embodiments, the tissue graft is applied to a wound area for a period of at least 30 days. In certain embodiments, the tissue graft is applied to a wound area for a period of one, two, three, four, five, six, seven, eight, nine, ten, eleven, or twelve weeks. In some instances, the tissue graft is applied as singular application. In other instances, multiple tissue grafts are applied periodically to a wound area, e.g., an application of two, three, four, or more tissue grafts over a wound, where each application is every 7, 10, 14, 30 days.

As an anti-adhesion barrier, the tissue grafts described herein may be used in cardiac, thoracic, abdominal, foot, and ankle surgery. In some embodiments, the grafts are used in cardiac surgery. In some embodiments, the grafts are used in thoracic surgery. In some embodiments, the grafts are used in abdominal surgery. In some embodiments, the grafts are used in foot surgery. In some embodiments, the grafts are used in ankle surgery. It is contemplated that the tissue grafts described herein are used to fashion tubes for construction of vascular conduits or to repair heart valve leaflets.

In certain embodiments, the tissue grafts described herein may be used in the treatment of cardiac tissue, including the valves and arteries.

In regenerative medicine, the tissue grafts described herein may be used as a scaffold for tissue reconstruction and regeneration including tendon and other connective tissue repair and reconstruction, as a delivery vehicle for cells and bioactive factors. In certain embodiments, the tissue grafts described herein may be used in the treatment of an injured tendon.

In post-operative atrial fibrillation, the tissue grafts described herein are used in the prevention of atrial fibrillation following open heart surgery (e.g., valve repair, valve replacement, atrial septal defect, or ventricular septal defect, etc.), coronary artery bypass grafting, and transmyocardial laser revascularization, among others. In particular, these tissue grafts are believed to provide an anti-inflammatory action at the application site, along with pericardial closure to protect the surface of the heart. In myocardial infarction, or other cardiac disease, the tissue grafts described herein are used to prevent or reduce size and/or severity of scarring occurring due to a myocardial infarction or other cardiac disease.

In cardiac surgery, the tissue grafts described herein are used in enhancing recovery following cardiac surgery (e.g., valve repair, valve replacement, atrial septal defect, or ventricular septal defect, coronary artery bypass grafting, and transmyocardial laser revascularization, among others) by placing the tissue grafts described herein into the cardiac area. "Cardiac area" as used herein, refers to the region around the heart including but not limited to the heart, the pericardial cavity, the pericardium, and the coronary arteries and veins. In particular, these tissue grafts are believed to provide an anti-inflammatory action at the application site. In myocardial infarction, or other cardiac disease, the tissue grafts described herein are used to limit adverse cardiac remodeling (e.g., scarring occurring due to a myocardial infarction or other cardiac disease). In some embodiments, these tissue grafts are also used to assist in pericardial closure to protect the surface of the heart.

In myocardial infarction, the tissue grafts herein in some embodiments are used to minimize damage to the cardiovascular system caused by a myocardial infarction. In particular, these grafts can be placed in individuals experiencing an acute myocardial infarction and undergoing a coronary artery bypass procedure. Tissue grafts described herein limit the size and/or severity of scarring following a myocardial infarction.

Advantageously, the tissue grafts described herein may have one or more improved handling or performance characteristics, such as flexibility, non-brittleness, and/or structural integrity, that make the tissue graft particularly suitable for certain uses or applications. For example, a highly flexible and non-brittle tissue graft may be desired for tendon wrapping or deep wound healing, because of the wound morphology or anatomic features of such treatment sites. Additionally, improved handling and structural integrity may provide medical practitioners with improved control over placement of the tissue graft at a patient wound or other treatment site. Additionally, it is contemplated that the increased mechanical performance of these tissue grafts (i.e. suture retention strength) facilitates the anchoring of the tissue graft into deep wound beds and allow for a suture stitch on the proximal and distal ends of a graft wrap.

EXAMPLES

Example 1—Tissue Graft Preparation

Placental tissue grafts were prepared in accordance with the present disclosure, by obtaining a human fetal support tissue membrane obtained from donated placenta, contacting the donated human fetal support tissue membrane with a hypotonic solution to osmotically swell cell matter at a maternal side of the human fetal support tissue membrane, and removing swollen trophoblast and decidua cell matter from a chorion connective, supportive tissue layer of the human fetal support tissue membrane to produce an isolated human fetal support tissue membrane which comprises amnion and the chorion connective, supportive tissue layer, which amnion and chorion are in an original, undisrupted connective architecture. The isolated human fetal support tissue membrane was decontaminated with ethanol, dried in the apparatus disclosed herein, and terminally sterilized with radiation. The resulting tissue membrane was analyzed as described below, to determine various properties of the membrane. The tests conducted to measure certain characteristics of the tissue grafts are described in more detail below.

Example 2—Analysis of Membrane Layer Structure and Compactness

As discussed above, histological analysis, as shown in FIGS. 2 and 3, was performed to confirm that the maternal cell matter was removed during processing and to analyze the effect of the drying process on the tissue membrane. From the histological analysis, it was determined that the hypotonic removal of cell material was effective at removing the maternal decidua and trophoblast layers, while maintaining the amnion and chorion in the native, or natural, connective architecture. Additionally, the histological analysis showed that the drying apparatus and method disclosed herein was effective to produce a compact membrane having very little anatomical distinction between the amnion and chorion layers (i.e., it was histologically difficult to differentiate the layers).

Data on the porosity void fraction, of the compact tissue was collected using an image analysis test method, in which it was determined that the sample tissue membranes from 5 donors display an overall compactness or closed spaces of 97.9±1.5%. In brief, samples were processed using standard histological processing methods. Samples were then sectioned (5 µm thick) and mounted on slides. The samples were then stained using hematoxylin and eosin (H&E) and cover slipped (see FIG. 4, panel B). The stained slides were imaged using a microscope with a 20× objective. The images were then imported into image analysis software (ImageJ) and a macro was run to look at portions of the tissue that did not stain. These areas are considered pores within the tissue and calculated as a percent open area based on pixels.

FIG. 4, panel B, shows one of the H&E stained tissue graft samples used to determine the open volume of the processed tissue graft, while FIG. 4, panel A, shows a commercially available laminated amnion-chorion (i.e., separated layers reassembled) tissue graft that has also been H&E stained. (FIG. 4, panel A, taken from Koob, Thomas J., et al. "Properties of dehydrated human amnion/chorion composite grafts: implications for wound repair and soft tissue regeneration." *J Biomedical Materials Research Part B: Applied Biomaterials* 102.6 (2014): 1353-62) From this image, the commercially available laminate product was determined to have a compactness of 82.9 percent. Thus, the tissue grafts made by the process disclosed herein displays greater compactness, which is hypothesized to reduce the rate of proteolysis and retard the elution of bioactives. Specifically, it is believed that the denser (i.e., less porous) tissue structure allows extended delivery (i.e., diffusion based) of bioactives and extended life of the ECM in the wound bed because the compact structure is more resistant to enzymatic protease infiltration into the membrane system and the resulting degradation.

It is contemplated that the maintenance of the connective structure of the amnion and chorion and/or vacuum drying on one side of the tissue to which a force is being applied, each may provide these improved structural properties of the tissue grafts, as opposed to those commercially available tissue grafts in which the amnion and chorion are separated and which are believed to be dried using a convection oven-type apparatus.

Example 3—Retention of Bioactives

First, an enzyme-linked immunosorbent assay (ELISA) assessment of growth factors/cytokines, protease inhibitors, and glycosaminoglycans was performed on the implant-ready tissue grafts. In brief, tissue grafts were extracted in either physiological relevant solutions or detergents. The samples were then diluted to ensure the endpoints would be within the standard curve for each respective assay. The results are shown below in Table 1, which gives the minimal amount of selected moieties isolated from any given donor as well as the average and standard deviations of multiple donors.

TABLE 1

| 6 donors 20 sections | | Avg | SD | Min |
|---|---|---|---|---|
| bFGF | pg/mg | 13641.42 | 6985.92 | 6235.31 |
| HGF | pg/mg | 337.63 | 216.01 | 67.06 |
| TIMP-1 | pg/mg | 13351.64 | 5789.32 | 4842.19 |
| HA | pg/mg | 16844.93 | 8112.73 | 5665.08 |

Comparative data on a commercially available laminated amnion-chorion (i.e., layers separated then reassembled) tissue graft was obtained from publicly available articles and is given in Table 2 below. (Data from Koob, Thomas J., et al. "Biological properties of dehydrated human amnion/chorion composite graft: implications for chronic wound healing." *International Wound Journal* 10.5 (2013): 493-500; and Koob, Thomas J., et al. "Angiogenic properties of dehydrated human amnion/chorion allografts: therapeutic potential for soft tissue repair and regeneration." *Vasc Cell* 6.10 (2014).)

TABLE 2

| | Koob - Angiogenic . . . (2014) | | | Koob - Biological . . . (2013) | | |
|---|---|---|---|---|---|---|
| | Avg | SD | Donor # | Avg | SD | Donor # |
| bFGF (pg/mg dry tissue) | 0.717 | 0.225 | 8 | 1649.4 | 925.4 | 56 |
| HGF (pg/mg dry tissue) | 245.418 | 103.302 | 8 | N/A | N/A | N/A |
| TIMP-1 (pg/mg dry tissue) | N/A | N/A | N/A | 6356.8 | 3410.1 | 55 |

While no published data on the HA content of these comparative laminated tissue grafts was found, qualitative images based on Alcian blue staining of histological sections was found, and is shown in FIG. 4, panel C. (Image from Koob, Thomas J., et al. "Properties of dehydrated human amnion/chorion composite grafts: implications for wound repair and soft tissue regeneration." *J Biomedical Materials Research Part B: Applied Biomaterials* 102.6 (2014): 1353-62.) A comparative image of a tissue graft sample prepared using the methods disclosed herein and stained with Alcian blue is shown at FIG. 4, panel D. In FIG. 4, panel D, it is noted that the exemplary tissue graft contains a significant amount of HA as depicted from the bright staining. In contrast, the comparative laminated tissue graft has much less HA content as depicted from the light stain from FIG. 4, panel C.

Figure 11:
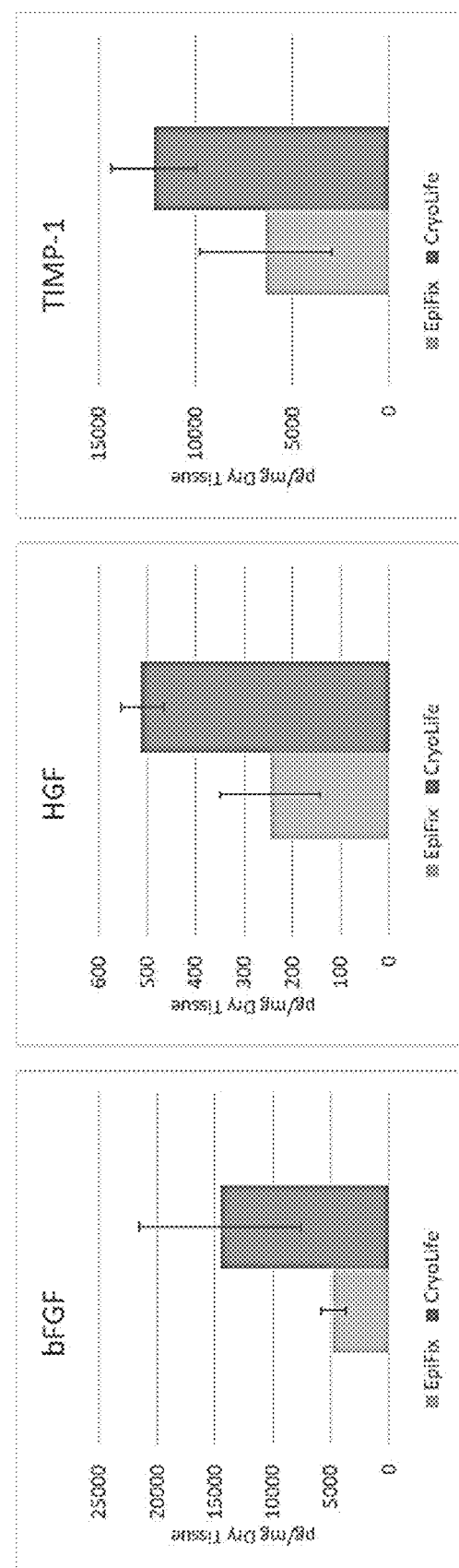
FIG. 11 depicts an assay of bioactive concentrations (bFGF, HGF, and TIMP-1) of an exemplary tissue graft as compared to a commercially available product (Koob et al., J Biomed Mater Res B Appl. Biomater, 2014, 102(6) 1353-62).
Figure 12:
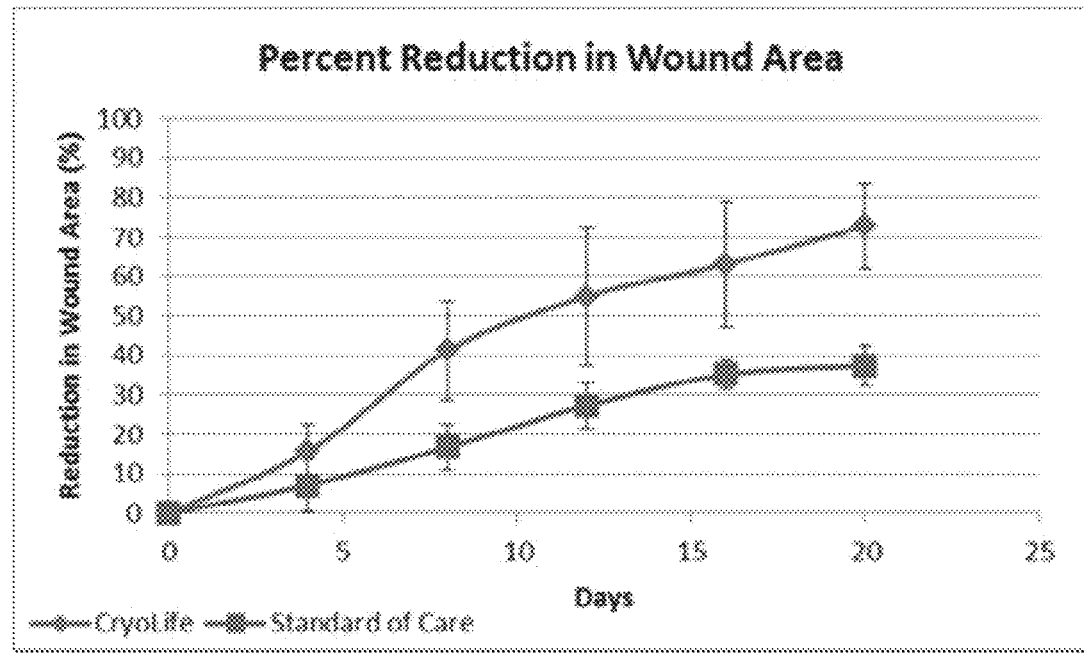
FIG. 12 depicts the percent reduction in wound area versus time with an exemplary tissue graft or an absorbent dressing control material in a diabetic animal wound healing model.
Figure 13:
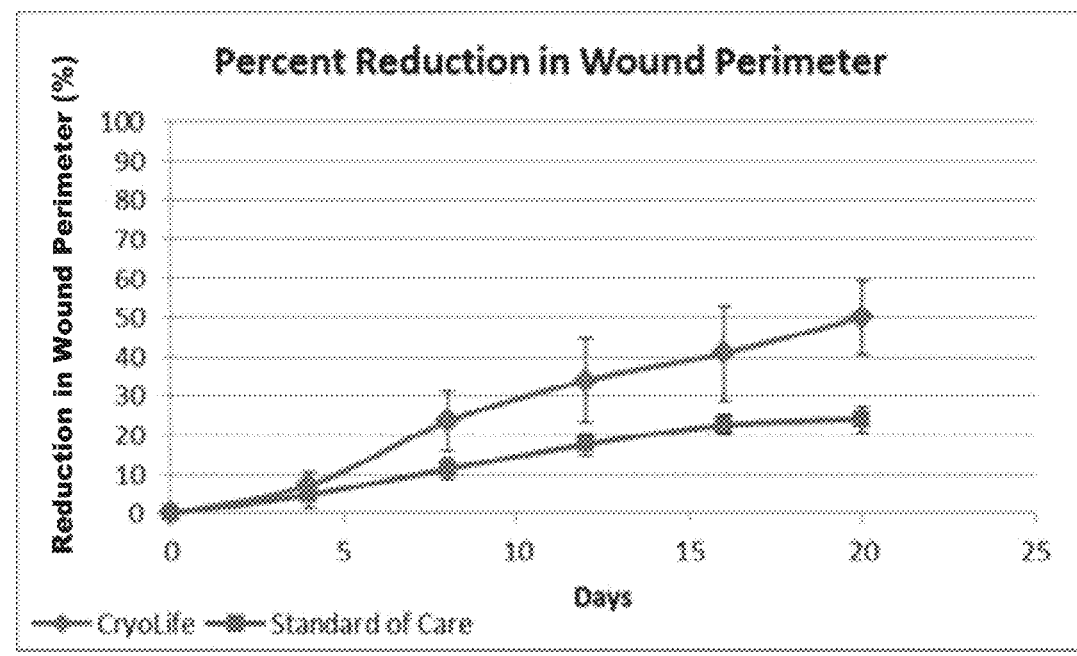
FIG. 13 depicts the percent reduction in wound perimeter versus time with an exemplary tissue graft or an absorbent dressing control material in a diabetic animal wound healing model.

The tissue grafts made by the presently disclosed methods were also tested using the protocols outlined in Koob, Thomas J., et al. "Properties of dehydrated human amnion/chorion composite grafts: implications for wound repair and soft tissue regeneration." *J Biomedical Materials Research Part B: Applied Biomaterials* 102.6 (2014): 1353-62, with the comparative bioactives content data being given in FIG. 11 for three moieties.

Overall, from the images of the stained tissue samples and comparative bioactives data collected, it is clear that the tissue grafts made from the methods described herein maintain a significantly greater content of bioactives as compared to commercially available laminated amnion-chorion (i.e., layers separated and then reassembled) tissue graft. Without intending to be bound by a particular theory, it is believed that the benign processing conditions and/or maintenance of the connective structure of the amnion and chorion as taught herein, provides the improved maintenance of desirable bioactives, which it is believed will result in more effective healing and promotion of cell in-migration, proliferation, and differentiation along with an anti-inflammatory action.

Additionally, the distribution and presence of growth factors and structural proteins were also assessed via immunohistochemistry (IHC) in further studies. In these studies, control and processed tissue was formalin fixed and 5 μm sections were then placed on slides using standard histologic means. Using standard IHC techniques the amount and location of the biological motifs were assessed.

The protein components of this tissue were also assessed using gel electrophoresis. The intensity and the molecular weight (MW) of the dye stained proteins were analyzed. This technique showed the no major alterations on the composition of extracts derived from control (unprocessed) tissues and processed tissues.

Finally, tissue grafts and extracts of tissue grafts containing the material's endogenous bioactives were used as the media for cell culture studies to determine their effect on the viability and proliferative response of multiple types of human derived cell lines.

Example 4—Alloantigenicity Detection

A mixed lymphocyte reaction (MLR) was used to explore the allogenicity of the tissue grafts disclosed herein. In brief, fully processed membranes were cultured with allogeneic peripheral blood mononuclear cells (PBMCs) from three different donors in a MLR and the proliferation of lymphocytes was assessed by BrdU. Table 3 lists the Stimulation Index of tissue graft samples with PBMCs from the three donors. Table 4 shows the Stimulation Index of mixes of PBMCs.

TABLE 3

| Tissue graft | Donor 1 | Donor 2 | Donor 3 |
|---|---|---|---|
| T1-A | 0.03 | 0.04 | 0.03 |
| T1-B | 0.06 | 0.18 | 0.25 |
| T2-A | 0.24 | 0.32 | 0.40 |
| T2-B | 0.05 | 0.26 | 0.89 |
| T3-A | 0.14 | 0.16 | 0.00 |
| T3-B | 0.00 | 0.14 | 0.50 |

TABLE 4

| PBMC mix | SI |
|---|---|
| Donor 1 × Donor 2 | 11.2 |
| Donor 1 × Donor 3 | 6.5 |
| Donor 2 × Donor 3 | 8.5 |

The results demonstrated that the processed membranes did not generate an increase in lymphocyte number.

Additionally, feasibility studies have demonstrated that the tissue graft does not stimulate allogeneic PBMCs and that it does enhance the rate of closure of dermal wounds in a diabetic mouse model.

Example 5—Bioburden Analysis

The bioburden of processed tissue grafts after ethanol decontamination and drying was assessed via an external laboratory. Test articles 1-10 were 14 mm disc membranes and test articles 12-21 were 5 mm×6 mm rectangular membranes. The bioburden test results confirmed minimal bioburden present on the processed membranes, as shown in Table 5 below.

Results

TABLE 5

| Results | | | | |
|---|---|---|---|---|
| Unit # | Test Article | Aerobic | Anaerobic | Fungal |
| 1 | #1A | <4 | <4 | <4 |
| 2 | #2A | <4 | <4 | <4 |
| 3 | #3A | <4 | <4 | <4 |
| 4 | #4A | <4 | <4 | <4 |
| 5 | #5A | <4 | <4 | <4 |
| 6 | #7A | <4 | <4 | <4 |
| 7 | #9A | <4 | <4 | <4 |
| 8 | #10A | <3 | <4 | <3 |
| 9 | #11A | <4 | <4 | <4 |
| 10 | #13A | <4 | <4 | <4 |
| Averages | | <3.9 | <3.9 | <4.0 |
| Recovery Efficiency | | | UTD | |
| 12 | #1B | <4 | <4 | <4 |
| 13 | #2B | <4 | <4 | <4 |
| 14 | #3B | <4 | <4 | <4 |
| 15 | #4B | <4 | <4 | <4 |
| 16 | #5B | <4 | <4 | <4 |
| 17 | #7B | <4 | <4 | <4 |
| 18 | #9B | <4 | <4 | <4 |
| 19 | #10B | <4 | <4 | <4 |
| 20 | #11B | <4 | <4 | <4 |
| 21 | #13B | <4 | <4 | <4 |
| Averages | | <3.9 | <4.0 | <4.0 |
| Recovery Efficiency | | | UTD | |

<=No Organisms Detected
Note:
The results are reported as colony forming units per test article Example 6—Water Content Analysis Water content of the prepared tissue grafts was determined by gravimetric analysis. In brief, the sample was weighed, heated to a temperature above the boiling point of water, and weighed again. As discussed above, it was determined that the drying apparatus disclosed herein was capable of consistent dehydration of tissue samples to 5 percent water content, or less. The two-step drying process disclosed above achieved a desired dehydration level of 10 percent water content, or less, depending on properties desired. The first drying step generally dries the tissue graft to a water content of between 15 and 10 percent to enable cutting and dicing of the tissue. The secondary drying step is then used to dry the tissue after it is exposed to the room and to further dry the tissue to enhance stability for room temperature storage.

Example 7—Stability Studies

The stability of the tissue grafts prepared by the disclosed methods was determined by analysis of structural proteins with differential scanning calorimetry, glycosaminoglycans GAGs with electrophoresis, and cell proliferation assays.

Example 8—Use of Buffered Peracetic Acid as a Decontaminant

It was discovered that buffering peracetic acid to a neutral pH of 4.5 to 7.5 enables a higher retention of bioactive molecules (i.e., HGF, KGF, and TIMP-1) compared to non-buffered peracetic acid. Specifically, using commercially available peracetic acid concentration test strips (i.e., test strips that determined the potency level of peracetic acid in a solution), greater stability of peracetic acid was observed during dilution of 40% peracetic acid in acetic acid into a buffered solution with certain parameters (i.e., molarity of the buffer, initial pH). These specific bioactives (HGF, KGF, and TIMP-1) may advantageously characterize a tissue with different indications than the one resulting from treatment with ethanol.

Example 9—Suture Retention, Membrane Tensile Strength and Bending

Figure 14:
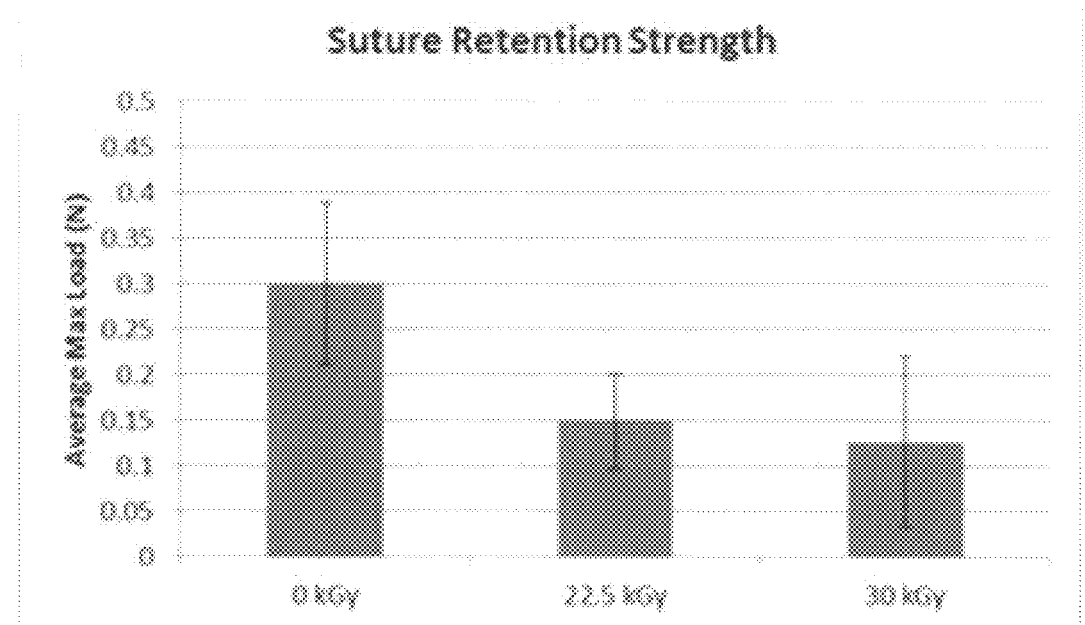
FIG. 14 depicts suture retention strength versus various dosages of ionizing radiation or control (zero kGy).

First, a suture loop (4-0 polypropylene monofilament) was placed through the end of a tissue sample (2 mm from short edge of 10 mm×20 mm tissue coupon), looped over a fixture attached to a 10 N load cell, and pulled under uniaxial tension until failure occurred while monitoring the applied load at a fixed elongation rate of 50 mm/min. The samples came from three donors each with samples irradiated at 0 (Control), 22.5, and 30 kGy, were each tested in triplicate. The results are given in FIG. 14 and indicate that suture retention strength declines from Control values following irradiation at either 22.5 kGy or 30 kGy (p-value=0.001 by ANOVA). However, these differences may be due to the directionality of testing as some samples appear to rip straight out of the tissue and some pull and create a horizontal tear first.

Figure 15:
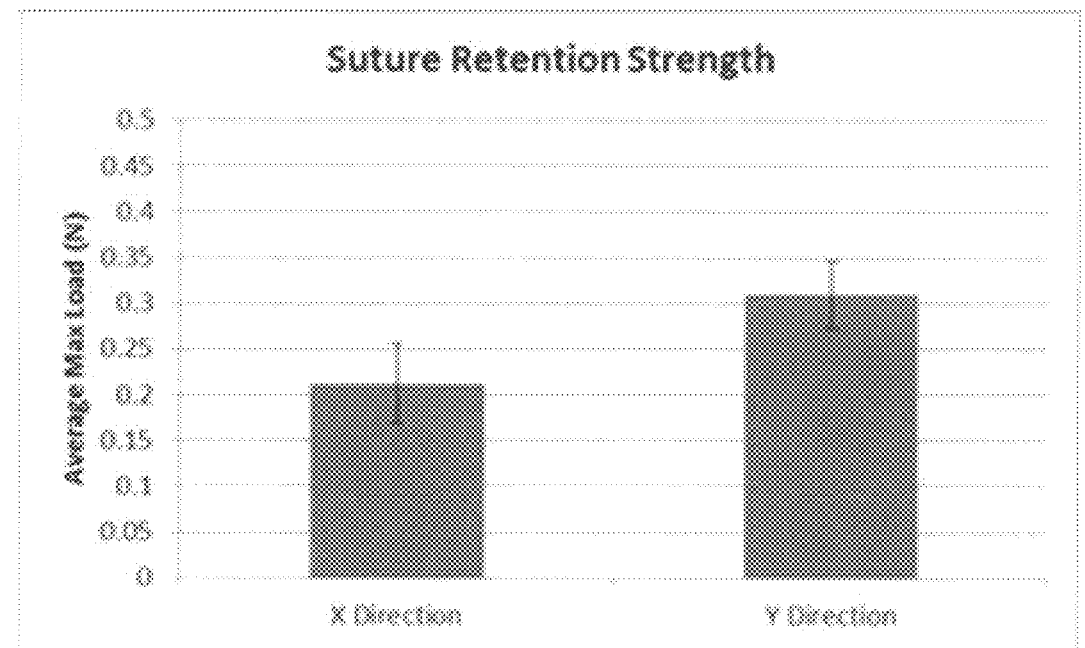
FIG. 15 depicts suture retention strength of an exemplary tissue graft that is pulled in either in a x-direction or a y-direction.

Second, a suture loop (4-0 polypropylene monofilament) was placed through the end of a tissue sample (2 mm from short edge of 10 mm×20 mm tissue) and pulled under uniaxial tension until failure occurred while monitoring the applied load at a fixed elongation rate of 50 mm/min. The samples came from one donor, non-irradiated, tested eight times, with four replicates cut in one direction and four cut in the perpendicular direction. The results are given at FIG. 15, and indicate that suture retention strength is significantly different within the same section of tissue depending on the pulling direction (p-value=0.025 by ANOVA). Two of four samples pulled in the x-direction ripped straight out of the tissue while the other two and all four samples pulled in the y-direction created a horizontal tear first.

Figure 16:
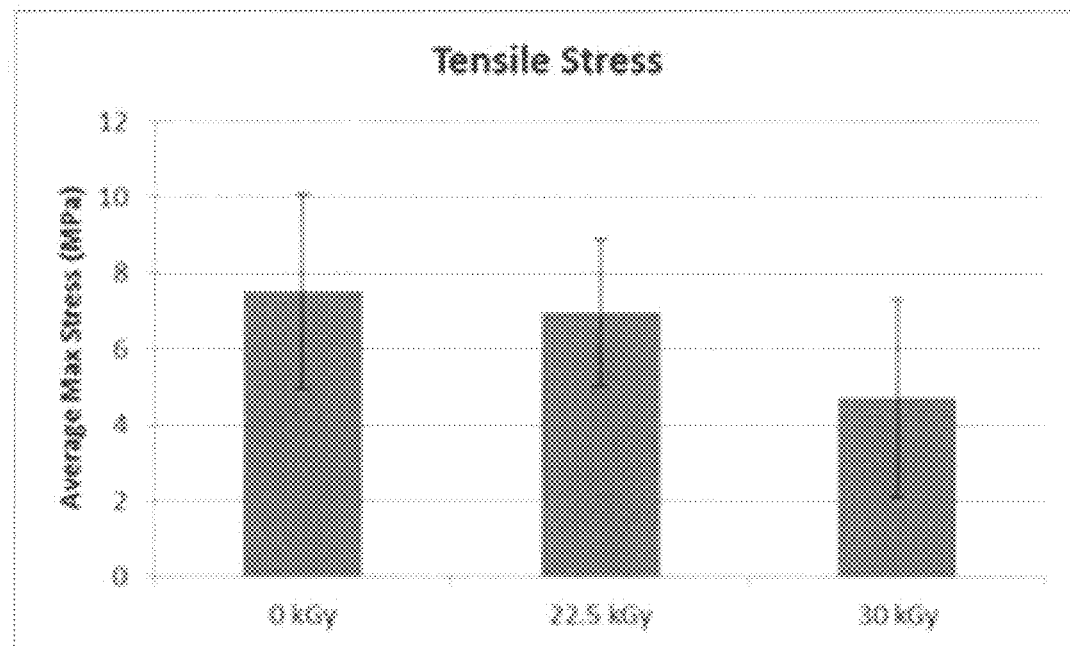
FIG. 16 shows tensile stress in non-irradiated versus irradiated exemplary tissue grafts.
Figure 17:
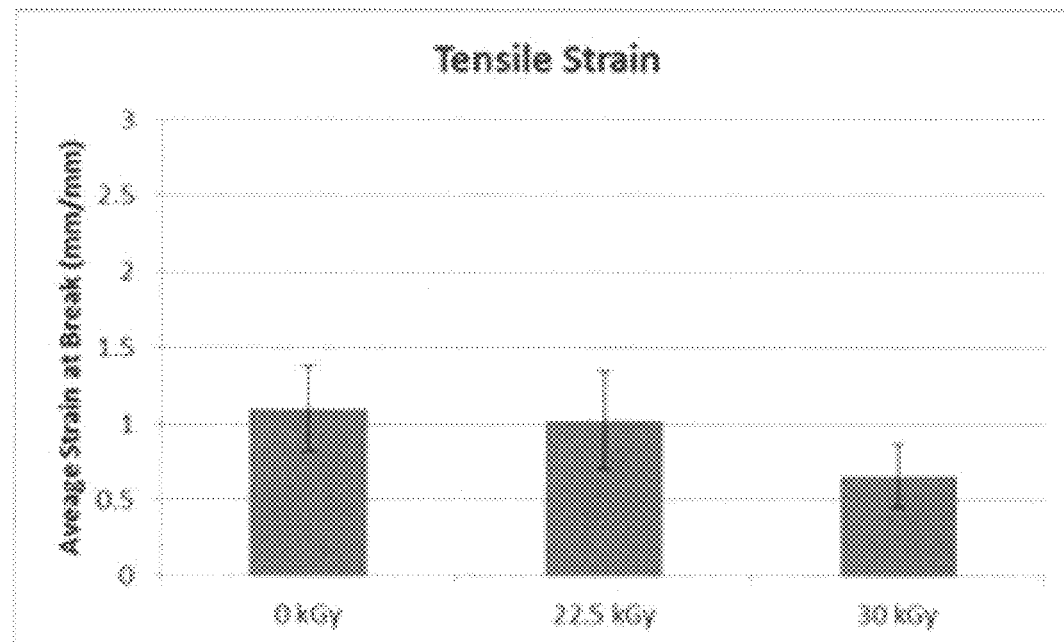
FIG. 17 shows tensile strain in non-irradiated versus irradiated exemplary tissue grafts.

Third, a 5 mm×20 mm strip of sheet tissue was pulled under uniaxial tension until failure occurred while monitoring the applied load with a 10 N load cell at a fixed elongation rate of 50 mm/min. The samples were from two donors each with samples irradiated at 0 (control), 22.5 (only one donor), and 30 kGy, tested in triplicate. The results are shown in FIGS. 16 and 17 and indicate that there is no significant difference between irradiated and non-irradiated tissue with regard to ultimate tensile stress and strain at break (p-value=0.231 and 0.058 respectively by ANOVA).

Figure 18:
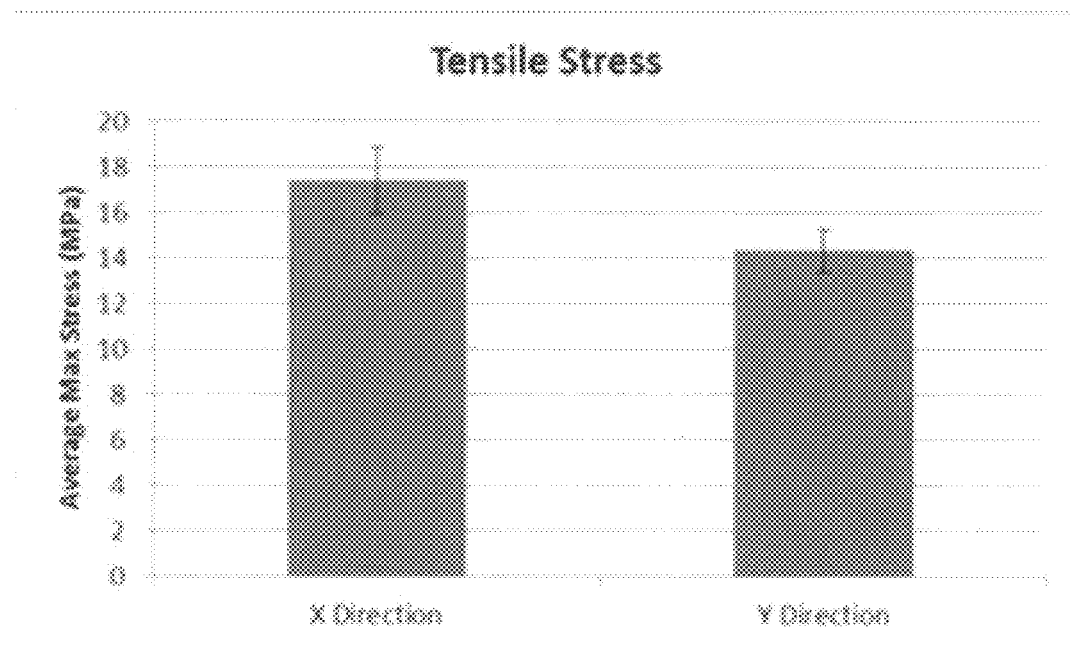
FIG. 18 shows tensile stress in an exemplary tissue graft that is pulled in either in a x-direction or a y-direction.
Figure 19:
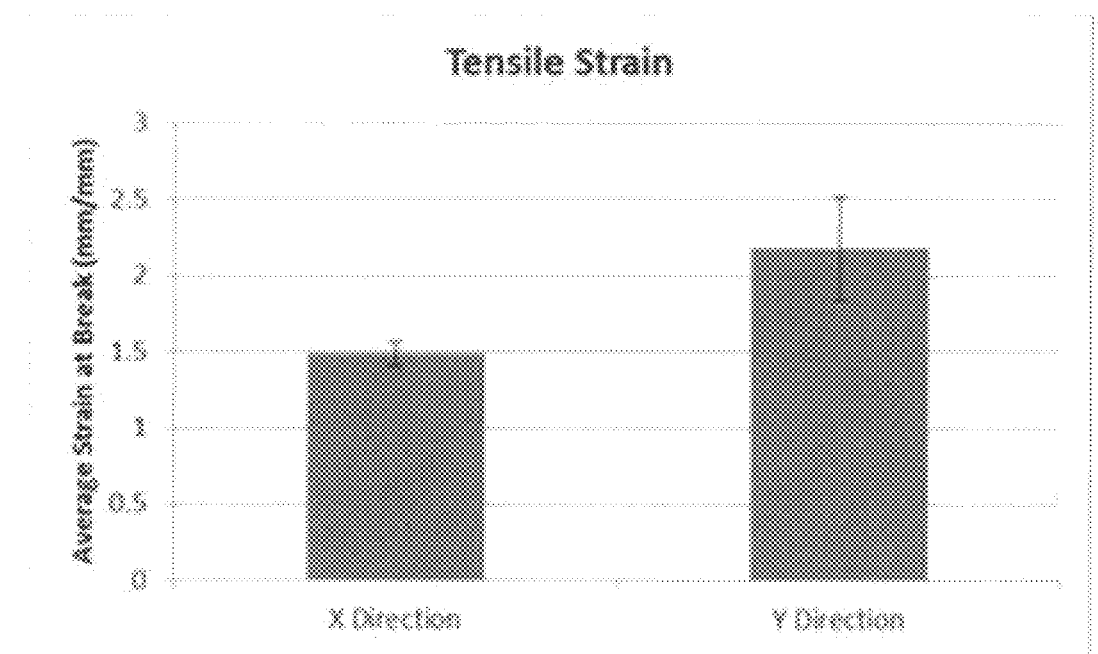
FIG. 19 shows tensile strain in an exemplary tissue graft that is pulled in either in a x-direction or a y-direction.

Fourth, a 3 mm wide dog bone shaped piece of sheet tissue was pulled under uniaxial tension until failure occurred while monitoring the applied load at a fixed elongation rate of 50 mm/min The samples were from one donor, non-irradiated, tested six times, three cut in one direction and three cut in the perpendicular direction. The results are shown in FIGS. 18 and 19, and indicate that ultimate tensile stress and strain at break show a difference between samples tested in one direction compared to the perpendicular direction. The tensile stress is not significantly different while the strain values are statistically different (p-value=0.068 and 0.049 respectively, by ANOVA).

Figure 20:
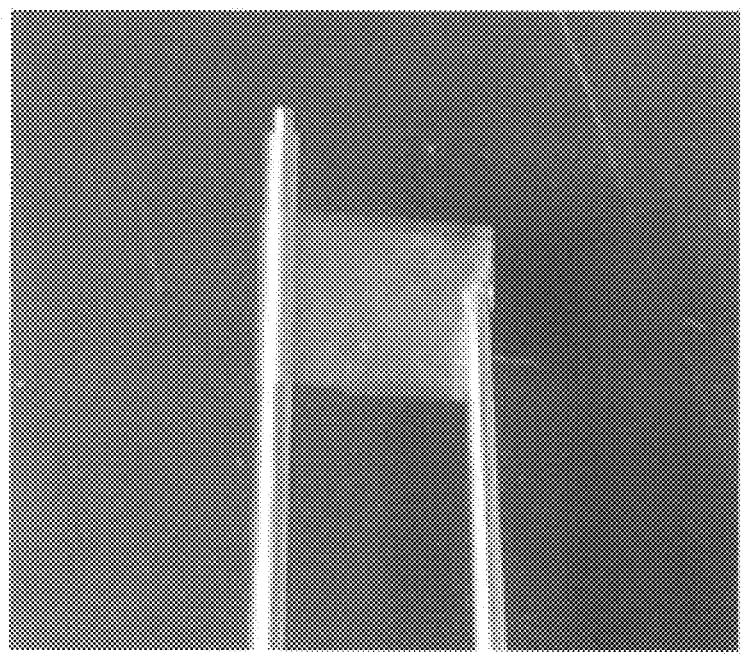
FIG. 20 is a photograph an exemplary tissue graft.

Fifth, a strip of dried sheet tissue at least 10 mm wide was manually rolled around a fixed mandrel of 2 mm diameter until the ends were parallel and the tissue was examined for cracking, breakage, or tearing. The samples were from three donors with samples tested three times each. A photograph of a sample during testing is shown at FIG. 20. No samples failed the radius of curvature test on a 2 mm diameter mandrel. Furthermore, most tissue samples dried in accordance with the disclosed embodiments were able to be folded completely and pressed to crease and remain unbroken. Once rehydration is initiated, any possibility of cracking and breakage was eliminated.

In summary, human placenta-derived tissue grafts have been developed that display high bioactives content and reduced alloantigenicity compared to known placental tissue grafts, and therefore may display improved healing properties. The placenta-derived products may display improved handling and performance properties, such as compactness, flexibility, suture retention, resistance to enzymatic breakdown, slow release of bioactives, and longer residence time at a wound or implantation site.

Generally, it is believed that because the native configuration of the membrane layers has never been violated (i.e., the amnion and chorion are not separated and/or treated in a separate manner), improved retention of bioactive elements present within and between these layers is achieved. To minimize both the potential inflammatory response in the recipient and the transfer of elements in the maternal blood, the decidua layer (cells of maternal origin) is removed along with a substantial portion of the trophoblast cell population which can contain maternal macrophages. That is, the goal of the processing is to maintain the native composition with three exceptions, the decidua layer, trophoblast cell population and the bulk of the residual blood in the membrane. Benign processing conditions that have a neutral pH and do not include of aggressive components, such as certain detergents, are believed to maintain bioactives in levels not seen with presently commercially available placental tissue grafts.

To lower the bioburden of the tissue, the tissue is decontaminated, such as with an ethanolic solution. To enable planar dried products with reproducible cross-sectional architecture and minimal open space, the tissue is placed in between a porous membrane and a nonporous material and dried under vacuum To facilitate stable storage, the membrane is desiccated to a final moisture content lower than 10 percent, as determined by loss on drying testing. The membrane is set onto a backing material with tabs that will enable stability during shipment and storage and to provide an easy means of delivery to the wound site. The membrane is terminally sterilized by ionizing radiation while in a dry state and at a minimal dosage commensurate with retention of activity of the contained bioactives and low bioburden of the input tissue following decontamination. Thus, tissue grafts prepared by most or all of these steps display improved properties over known placental tissue grafts.

Example 10—Preparation of Folded Membrane Tissue Grafts

Placental tissue grafts are prepared in accordance with the present disclosure, by obtaining a human fetal support tissue membrane obtained from donated placenta, contacting the donated human fetal support tissue membrane with a hypotonic solution to osmotically swell cell matter at a maternal side of the human fetal support tissue membrane, and removing swollen trophoblast and decidua cell matter from a chorion connective, supportive tissue layer of the human fetal support tissue membrane to produce an isolated human fetal support tissue membrane which comprises amnion and the chorion connective, supportive tissue layer, which amnion and chorion are in an original, undisrupted connective architecture. The isolated human fetal support tissue membrane is decontaminated with ethanol. The decontaminated isolated human fetal support tissue membrane is then folded so that the amnion layer is on the outside of the folded membrane and the chorion layer is in the center. The folded human fetal support tissue membrane is then dried in the apparatus disclosed herein, and terminally sterilized with radiation. The resulting tissue membrane is analyzed as described below, to determine various properties of the membrane. The tests conducted to measure certain characteristics of the tissue grafts are described in more detail below.

Example 11—Treatment of Wounds in a Diabetic Animal Wound Healing Model

Full-thickness acute excisional wounds were created on the dorsal flank of db/db (BKS.Cg-m Dock7m+/+Leprdb/J mice) mice (in vivo model of type II diabetes impaired wound healing). Placental tissue grafts prepared in accordance with the present disclosure were implanted in the wound bed of the test animals (CryoLife®). The implants were covered with a non-adherent dressing (Tegaderm™ Contact, 3M) and Bioclusive™ Film Dressing (Systagenix), the later to limit wound closure due to skin contraction. Control wounds (Standard of Care) received only Tegaderm™ and Bioclusive™ dressings. Only one application of the placental tissue graft was used. Wound closure (expressed as percent reduction in wound area) and length of wound margins (wound perimeter) were monitored at the indicated times following wounding by digital measurements (Image J, NIH) of digital images obtained after removal of the Tegaderm™ and Bioclusive™ dressings to visualize the wounds.

Example 12—Treatment of Myocardial Infarction in a Rat Model

Rats were acutely implanted with a placental tissue graft prepared in accordance with the present disclosure after inducing a myocardial infarction by permanent coronary artery ligation in the rats. Six weeks after the induced myocardial infarction, the rats were sacrificed and the heart and the chest cavity were examined Rats treated with the placental tissue graft as described herein had reduced myocardial fibrosis, likely due to reduced cell death, and no evidence of epicardial adhesions to the chest wall. Rats treated with a control graft experienced cardiac adhesions with the chest wall.

Example 13—Treatment of Myocardial Infarction

Patients who have experienced myocardial infarction are treated with placental tissue grafts prepared in accordance with the present disclosure. Placental tissue grafts are placed on the affected cardiac tissue. Patients treated with the placental grafts described herein experience reduced incidence of post-operative atrial fibrillation compared to patients not treated with the graft.

Example 14—Treatment of Post-operative Atrial Fibrillation

Patients experiencing open heart surgery are treated with placenta tissue grafts prepared in accordance with the present disclosure. Placental tissue grafts are placed on the affected cardiac tissue. Patients treated with the placental grafts as described herein experience reduced incidence of post-operative atrial fibrillation compared to patients not treated with the graft.

The examples and embodiments described herein are for illustrative purposes only and various modifications or changes suggested to persons skilled in the art are to be included within the spirit and purview of this application and scope of the appended claims.

What is claimed is:

1. A method of producing a tissue graft, the method comprising:
    removing decidua cells and trophoblast cells from a fetal support tissue membrane;
    compressing the membrane;
    dehydrating the membrane;
    decontaminating the membrane; and
    mounting the membrane to a: flexible backing material to produce a formed tissue graft;
    wherein the native connective architecture between an amnion layer and a chorion layer of the membrane is maintained intact throughout the method,
    wherein the amnion layer is not decellularized,
    wherein the steps of compressing the membrane and dehydrating the membrane are performed simultaneously, and wherein the steps of compressing the membrane and dehydrating the membrane comprise positioning the membrane between a moisture-permeable support platform and a gas-impermeable sealing sheet, then depressurizing a chamber below the moisture-permeable support platform to pull a vacuum across the platform using a vacuum source,
    wherein the chamber, being below the moisture-permeable support platform, defines an opening at one end, the chamber being in fluid connection with the vacuum source, and
    wherein the moisture-permeable support platform covers the opening of the chamber and comprises a perforated rigid support layer and a moisture, liquid, and vapor permeable material layer, wherein the moisture, liquid, and vapor permeable material layer is positioned between the perforated rigid support layer and the membrane, and wherein the membrane is positioned between the gas-impermeable sealing sheet and the moisture, liquid, and vapor permeable material layer.

2. The method of claim 1, further comprising retaining at least 10,000 pg/mg of native basic fibroblast growth factor (bFGF) from the membrane in the formed tissue graft.

3. The method of claim 1, further comprising swelling the decidua cells and the trophoblast cells prior to removing the decidua cells and the trophoblast cells.

4. The method of claim 3, wherein swelling the decidua cells and the trophoblast cells further comprises contacting a maternal side of the membrane with a hypotonic solution.

5. The method of claim 4, wherein the decidua cells and the trophoblast cells are mechanically removed after swelling.

6. The method of claim 3, wherein removing the decidua cells and the trophoblast cells from the membrane reduces the alloantigenicity to a Stimulation Index of less than 1 when measured by a peripheral blood mononuclear cell BrdU proliferation assay.

7. The method of claim 1, wherein decontaminating the membrane comprises treating the membrane with buffered peracetic acid.

8. The method of claim 7, wherein the concentration of buffered peracetic acid is from about 0.01% to about 1% v/v.

9. The method of claim 1, wherein compressing the membrane further comprises applying a load to a surface of the membrane opposite the platform.

10. The method of claim 1, wherein dehydrating the membrane further comprises flowing air through the chamber while the chamber is in a sealed state.

11. The method of claim 1, wherein the moisture, liquid, and vapor permeable layer is a nonwoven or flashspun material.

12. The method of claim 1, wherein the gas-impermeable sealing sheet comprises silicone.

13. The method of claim 1, further comprising forming on the membrane a first, shiny surface adjacent to the gas-impermeable sealing sheet and a second, less shiny surface adjacent to the moisture, liquid, and vapor permeable layer.

14. The method of claim 1, wherein dehydrating the membrane comprises sinking moisture from the membrane using a desiccant material.

15. The method of claim 1, wherein mounting the membrane to a flexible backing material comprises releasably securing opposed ends of the membrane between two opposed tabs.

16. The method of claim 15, wherein the flexible backing material is larger than the membrane.

17. A method of using the tissue graft of claim 1, the method comprising storing the formed tissue graft at room temperature for at least six months and applying the formed tissue graft to a patient.

* * * * *